United States Patent
Nakajima

(10) Patent No.: US 9,081,502 B2
(45) Date of Patent: Jul. 14, 2015

(54) METHOD AND APPARATUS OF STORAGE VOLUME MIGRATION IN COOPERATION WITH TAKEOVER OF STORAGE AREA NETWORK CONFIGURATION

(71) Applicant: HITACHI, LTD., Tokyo (JP)

(72) Inventor: Akio Nakajima, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 206 days.

(21) Appl. No.: 13/654,724

(22) Filed: Oct. 18, 2012

(65) Prior Publication Data

US 2014/0115087 A1 Apr. 24, 2014

(51) Int. Cl.
*G06F 15/173* (2006.01)
*G06F 3/06* (2006.01)
*H04L 29/08* (2006.01)

(52) U.S. Cl.
CPC .............. *G06F 3/0605* (2013.01); *G06F 3/067* (2013.01); *G06F 3/0632* (2013.01); *G06F 3/0637* (2013.01); *H04L 67/1097* (2013.01)

(58) Field of Classification Search
USPC .................... 709/223, 212, 221; 370/252, 357
See application file for complete search history.

(56) References Cited

U.S. PATENT DOCUMENTS

| | | | |
|---|---|---|---|
| 7,827,260 B2 * | 11/2010 | Huston et al. ................. | 709/223 |
| 8,046,446 B1 * | 10/2011 | Karr et al. ..................... | 709/223 |
| 2007/0038679 A1 * | 2/2007 | Ramkumar et al. .......... | 707/200 |
| 2007/0263637 A1 | 11/2007 | Madnani | |
| 2009/0228589 A1 | 9/2009 | Korupolu | |
| 2009/0307378 A1 | 12/2009 | Allen et al. | |
| 2010/0074137 A1 * | 3/2010 | Banerjee et al. ............. | 370/252 |
| 2012/0054460 A1 | 3/2012 | Dai et al. | |
| 2012/0218990 A1 * | 8/2012 | Subramanyan et al. ...... | 370/357 |

OTHER PUBLICATIONS

Extended European Search Report mailed on Feb. 4, 2014, EPO Application No. 13183311.3-1862.

* cited by examiner

*Primary Examiner* — Kyung H Shin
(74) *Attorney, Agent, or Firm* — Procopio, Cory, Hargreaves & Savitch LLP

(57) ABSTRACT

Systems and methods directed to the automation of Storage Area Network (SAN) configuration when storage volume migration or server virtual machine migration is conducted. Systems and methods described herein may involve the takeover of a SAN network attribute for the migration, and may involve translation of zone object formats to facilitate the migration and ensure compatibility when the takeover is conducted.

18 Claims, 31 Drawing Sheets

Host Group Information ~51

| Host WWPN ~61 | Host LUN ~62 | Target Port WWPN ~63 | Internal LUN ~64 |
|---|---|---|---|
| Host WWPN A | 0 | Storage WWPN A | 0 |
| Host WWPN B | 1 | Storage WWPN A | 1 |
| Host WWPN C | 0 | Storage WWPN B | 0 |
| Host WWPN D | 1 | Storage WWPN B | 1 |
| ... | ... | ... | ... |

FIG. 6

SAN zoning and network attribute information ~53

| Zone Name ~81 | Target Port WWPN ~82 | Peer WWPN list ~83 | NW Attribute List ~84 |
|---|---|---|---|
| QOSHI_port_A | Storage WWPN A | Host WWPN A | QoS Hi xx |
|  |  | Host WWPN B |  |
|  |  | ... |  |
| TI_ZONE_port_B | Storage WWPN B | Host WWPN A | Traffic Isolation |
|  |  | Host WWPN B |  |
|  |  | ... |  |
| ... |  |  | ... |

FIG. 8

| Persistent N_Port ID mapping table ~114 | |
|---|---|
| N_Port WWN ~121 | Persistent N_Port ID ~122 |
| N.AA | AA.BB.CC |
| N.BB | AA.DD.EE |
| ... | ... |

FIG. 12

Figure 13:
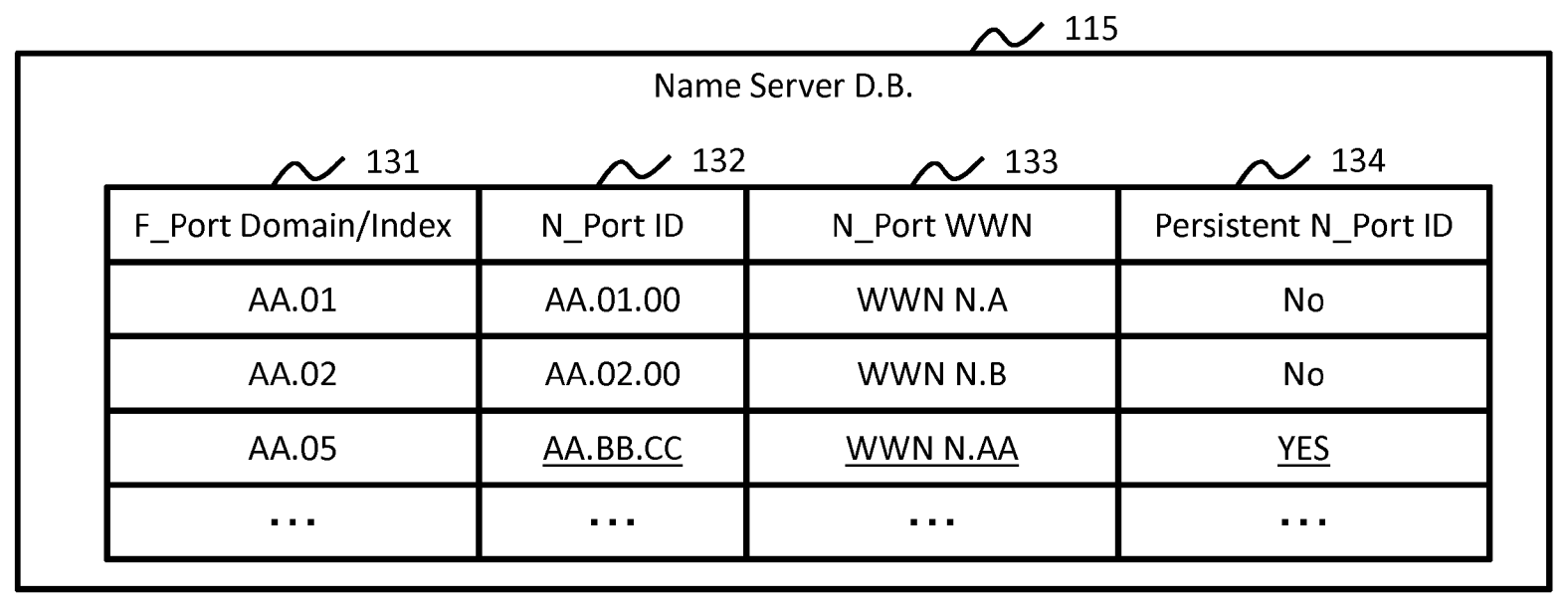

Name Server D.B. ~115

| F_Port Domain/Index ~131 | N_Port ID ~132 | N_Port WWN ~133 | Persistent N_Port ID ~134 |
|---|---|---|---|
| AA.01 | AA.01.00 | WWN N.A | No |
| AA.02 | AA.02.00 | WWN N.B | No |
| AA.05 | AA.BB.CC | WWN N.AA | YES |
| ... | ... | ... | ... |

Fabric Configuration Server DB

| Domain / Index | Port Type | Attached WWNN | Attached WWPN |
|---|---|---|---|
| AA.01 | F_Port | N_Port WWNN | N_Port (N.A) |
| AA.02 | E_Port | Adjacent SW (SW.B) | E_Port (SW.B.01) |
| AA.03 | E_Port | Adjacent SW (SW.B) | E_Port (SW.B.04) |
| ... | ... | ... | ... |

FIG. 14

Port QoS Table 115

| Domain/Index 181 | Rate Limit 182 | Traffic Class 183 | Virtual Channel 184 |
|---|---|---|---|
| AA.01 | No Limit | TC = 1 (High) | VC = 1,2,3,4 |
| AA.02 | 4Gbps | TC = 14 | VC = 5,6 |
| AA.03 | 1Gbps | TC = 18 (Low) | VC = 7 |
| ... | 3Gbps | N/A | N/A |

FIG. 18

METHOD AND APPARATUS OF STORAGE VOLUME MIGRATION IN COOPERATION WITH TAKEOVER OF STORAGE AREA NETWORK CONFIGURATION

BACKGROUND

1. Field

The present application is generally directed to computer systems, and more specifically, to storage networking, and interface protocol and server/storage migration.

2. Related Art

Storage Area Networks (SAN) such as Fibre Channel (FC) interconnects utilize zoning access control lists (ACL). The zoning ACL is configured by the Node Port (N_Port) Name Identifier (e.g., WWPN: World Wide Port Name), the Port Identifier (PID), the Domain/Port Index pair (DP Pair), or the Domain/Fabric Port (F_Port) Index Pair.

A SAN also has optional network features such as Quality of Service (QoS), ingress traffic limitation, and traffic isolation. These network features are configured by the Node Port (N_Port) Name Identifier, the Port Identifier or the Physical Port index number. The network features may also have optional parameters such as the QoS parameter, the traffic limitation parameter, and the traffic path information (set of Domain/N_Port index pair and Domain/F_Port index pair). These parameters are called zone attributes or network attributes.

The FC interconnects standard referenced in FC-LS-2 (Fibre Channel Link Service—Version 2) defines the Node Port Identifier Virtualization (NPIV). To utilize NPIV, the Virtual Node Port (VN_Port) is moved over from the physical Node Port (PN_Port) to the other PN_Port using a Fabric Discovery (FDISC) request, and controls the virtual WWPN identified VN_Port. When the VN_Port issues a NPIV FDISC request, the name server inside the SAN switch allocates a new N_Port ID for the VN_Port and sends a FDISC response Link Service Accept (LS_ACC) to the VN_Port that issued the FDISC request.

NPIV further utilizes a Node Port Name Identifier (WWPN). Zoning or optional network features may also utilize a Node Port Name Identifier or other identifier such as PID or a Domain/Port Index pair.

SUMMARY

Aspects of the present application include a storage system, which may involve an interface configured to receive a command from a computer for reading or writing data via a network; and a controller configured to manage read or written data of a logical volume based on the command, and to manage a first relationship among information of an initiator port of the computer, information of the logical volume, and information of an attribute of the network used for transferring the command.

Aspects of the present application further include a computer readable storage medium storing instructions for executing a process. The instructions may include receiving a command from a computer for reading or writing data via a network; managing read or written data of a logical volume based on the command, and managing a first relationship among information of an initiator port of the computer, information of the logical volume, and information of an attribute of the network used for transferring the command.

Aspects of the present application further include a method, which may involve receiving a command from a computer for reading or writing data via a network; managing read or written data of a logical volume based on the command, and managing a first relationship among information of an initiator port of the computer, information of the logical volume, and information of an attribute of the network used for transferring the command.

BRIEF DESCRIPTION OF THE DRAWINGS

FIG. 6 illustrates a table of the Host Group mapping information, in accordance with an example implementation.

FIG. 8 illustrates a table of the SAN zoning and network attribution information, in accordance with an example implementation.

FIG. 12 illustrates a Persistent N_Port ID mapping table 114, in accordance with an example implementation.

FIG. 13 illustrates a Name server DB 115, in accordance with an example implementation.

FIG. 14 illustrates a Fabric Configuration Server DB 115, in accordance with an example implementation.

FIG. 18 illustrates a Port based QoS table 115 for the SAN Switch physical port of the E_Port or the F_Port, in accordance with an example implementation.

DETAILED DESCRIPTION

In the related art, when storage volume migration or server Virtual Machine (VM) migration is performed, if the virtual Node Port (VN_Port) is migrated from the source server/storage to the destination server/storage using NPIV, the zoning ACL or zoning attributes cannot takeover because the NPIV does not takeover the NPID, the Domain/Port Index Pair or the zoning attribute information. The NPID, Domain/Port Index Pair or zoning attributes or network attributes contain the SAN zoning database of the SAN switch. The NPIV is performed by the Name Server of the SAN Switch and does not interact with the SAN Zoning Database.

Thus, if such optional network features are utilized, the storage volume migration or server VM migration fails and the computer system mail also fail because the NPIV cannot take over the NPID based zoning and because the VN_Port is outside of the zone ACL.

Further, if such optional network features are utilized, the storage volume migration or server VM migration may succeed, but the zoning attributes or network attributes cannot take over, because the NPIV is unrelated to the zoning database. Example implementations described herein are directed to resolving the problems that may occur during migration.

Figure 1:
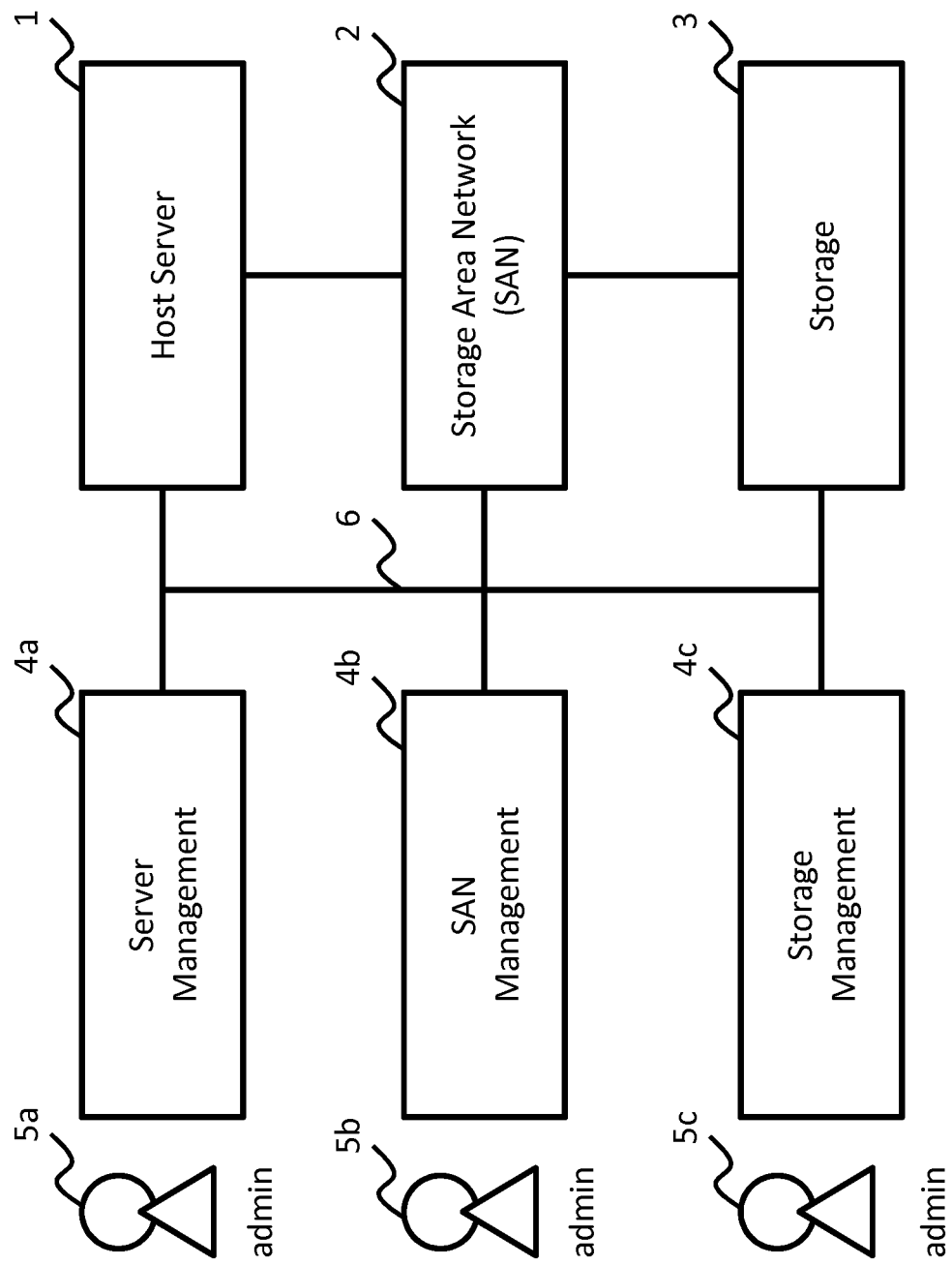
FIG. 1 illustrates a computer environment, in accordance with an example implementation.

FIG. 1 illustrates a computer environment, in accordance with an example implementation. The environment may involve a server 1, a storage area network (SAN) 2, a storage 3, and one or more management clients 4a-4c and connect management network 6 such as an ETHERNET network. One or more administrators 5a-5c may manage the server, storage and network by using a server management client 4a, a SAN management client 4b and a storage management 4c respectively, which may serve as interfaces to receive and/or facilitate commands from a computer (e.g., for reading or writing data) and communicate over a network.

Figure 2:
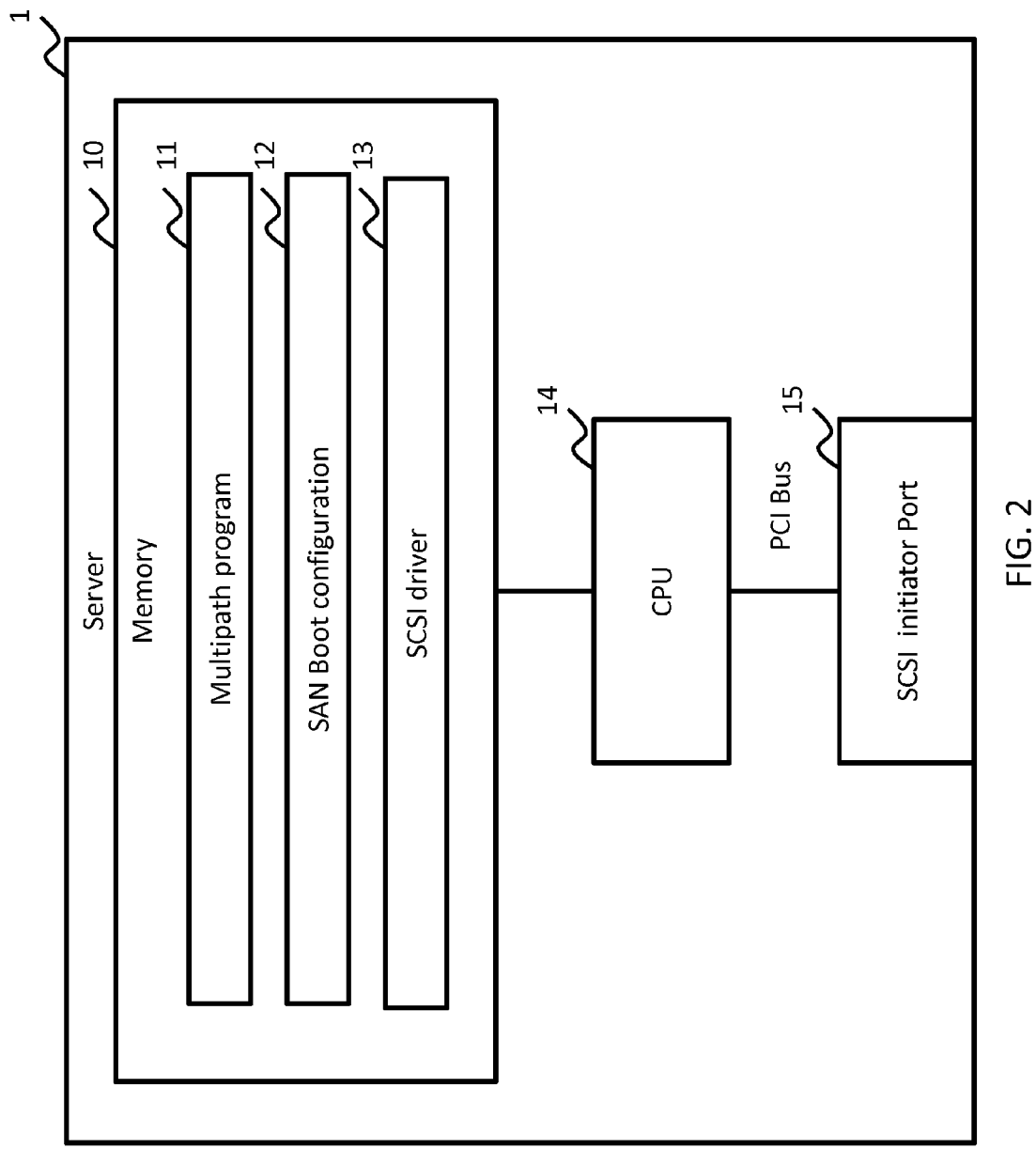
FIG. 2 illustrates a server, in accordance with an example implementation.

FIG. 2 illustrates a server, in accordance with an example implementation. The server 1 may involve a memory 10, a central processing unit (CPU) 14 and a Small Computer System Interface (SCSI) initiator port 15. The memory 10 may contain a multipath program 11, a SAN boot configuration 12, and a SCSI driver 13. The CPU 14 and memory 10 may be configured together in the form of a server controller. Instructions may be stored on the memory 13 of the server controller, which may be in the form of a computer readable storage medium, which is tangible media such as Random Access Memory (RAM), flash memory, HDD, detachable media (e.g. CD, DVD, etc.) or the like. The instructions may also be in the form of a computer readable signal medium, which can include non-tangible media such as a carrier wave.

Figure 3:
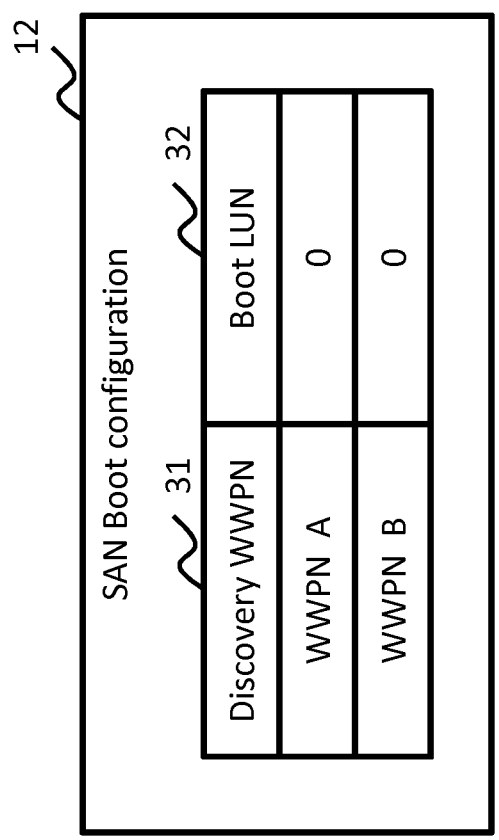
FIG. 3 illustrates a SAN boot configuration table, in accordance with an example implementation.

FIG. 3 illustrates a SAN boot configuration table, in accordance with an example implementation. The SAN boot configuration table 12 may include a Discovery WWPN 31 and a Boot LUN (Logical Unit Number) 32. The SAN boot configuration table 12 masks the boot target port, as the SCSI driver 13 under BIOS boot may have limited memory space. Thus, the SCSI driver under BIOS boot cannot be used for the discovery of a large SAN topology.

When Server 1 is booted, the SCSI driver 13 queries the SAN switch to determine if the SCSI initiator port is attached to the SAN Switch. The SCSI driver 13 issues a Port Login (PLOGI) to target the port that is listed by the SAN boot configuration table 12, and boot LUN.

Figure 4:
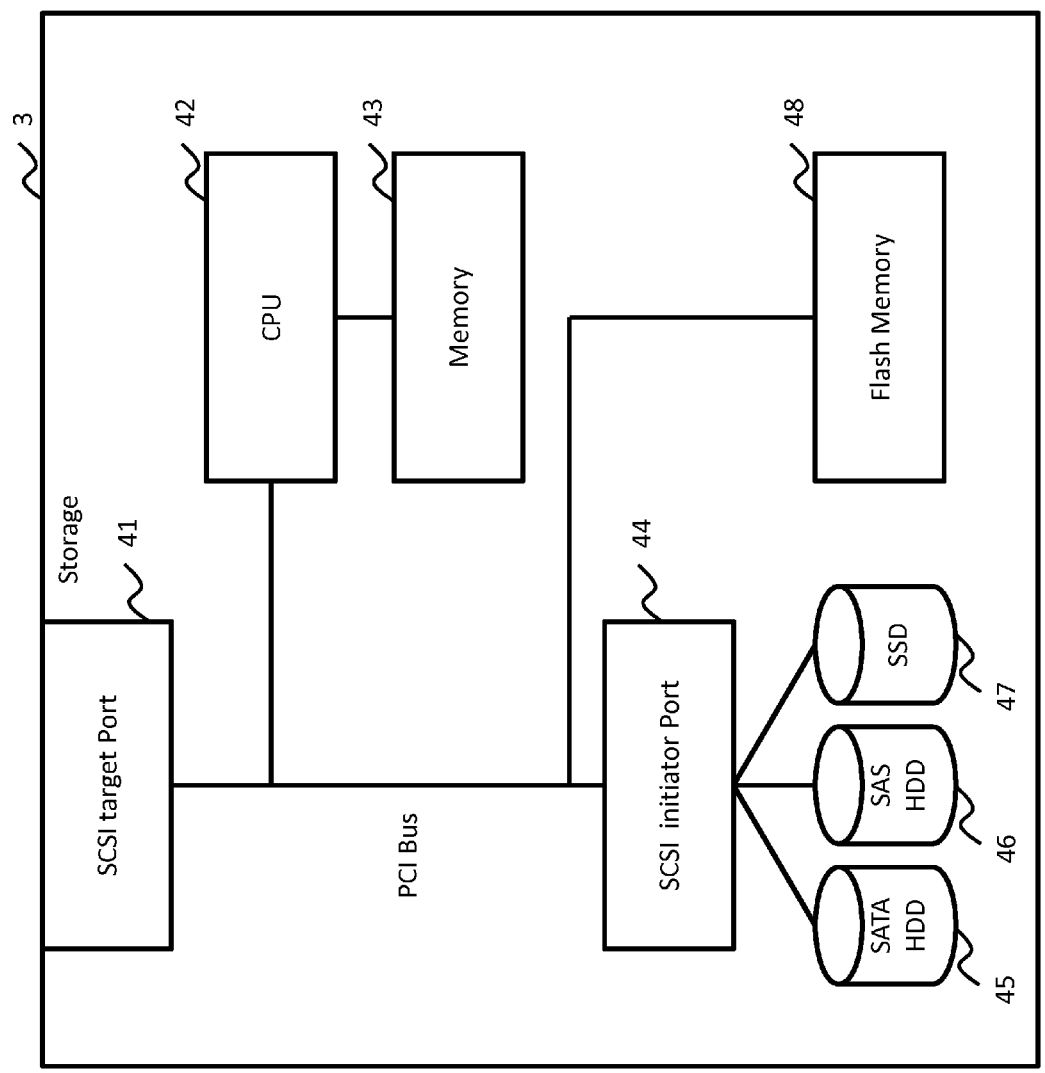
FIG. 4 illustrates a storage, in accordance with an example implementation.

FIG. 4 illustrates a storage, in accordance with an example implementation. The storage 3 may include a SCSI target port 41, CPU 42, Memory 43, SCSI initiator port 44, and storage media such as Serial AT attachment Hard Disk Drive (SATA HDD) 45, Serial Attached SCSI HDD (SAS HDD) 46, Solid State Drives (SSD) 47, and Peripheral Component Interconnect (PCI) bus attached flash memory 48. The CPU 42 and Memory 43 may be configured together in the form of a storage controller that can manage a relationship between information of the initiator port, the logical volume, and the attributes of the network and obtain information of the attributes of the network from the SAN 2 as needed. Instructions may be stored on the memory 43 of the storage controller, which may be in the form of a computer readable storage medium, which is tangible media such as Random Access Memory (RAM), flash memory, HDD, detachable media (e.g. CD, DVD, etc.) or the like. The instructions may also be in the form of a computer readable signal medium, which can include non-tangible media such as a carrier wave.

Figure 5:
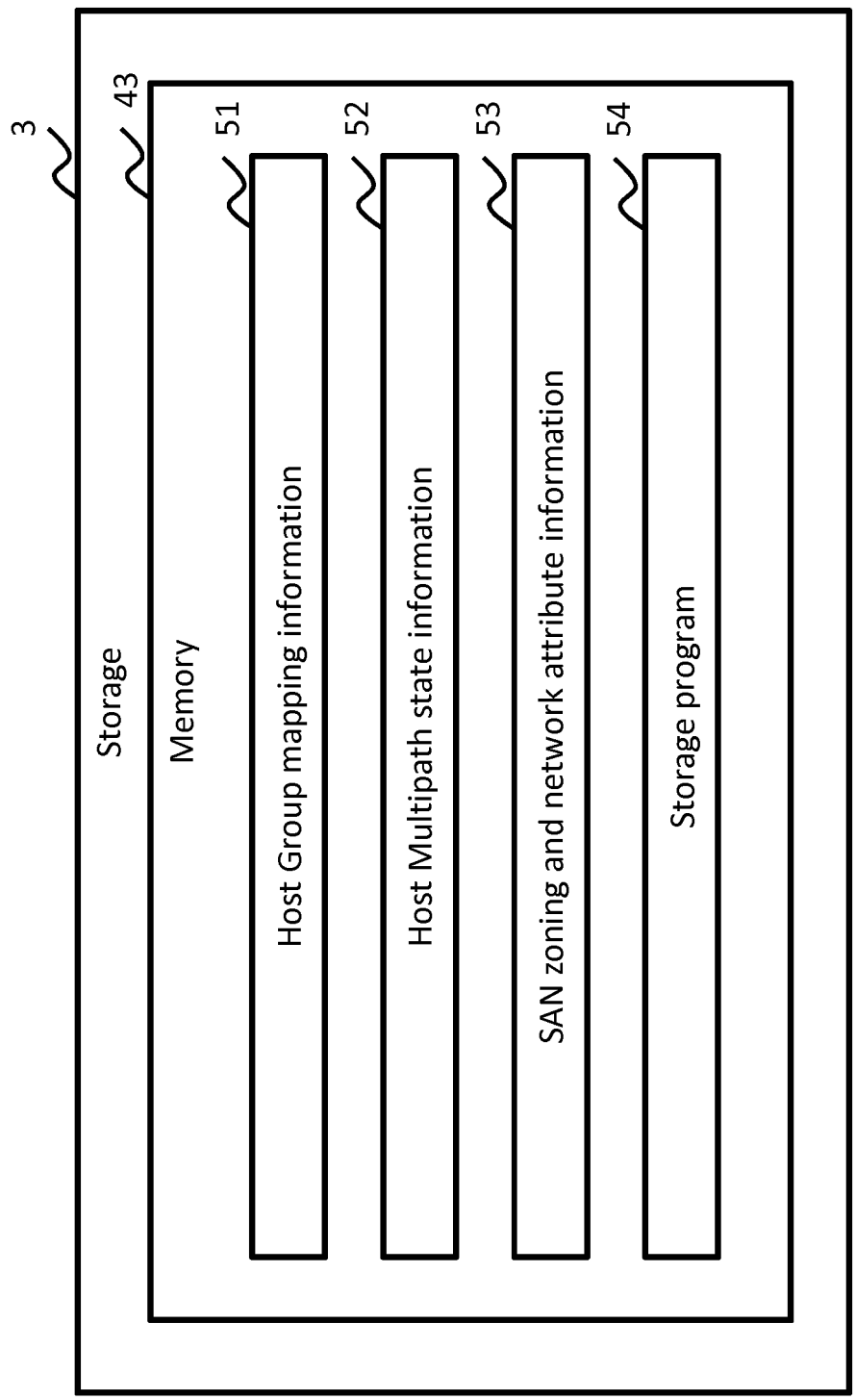
FIG. 5 illustrates a memory 43 of the storage 3, in accordance with an example implementation.

FIG. 5 illustrates a memory 43 of the storage 3, in accordance with an example implementation. The memory 43 may include Host Group mapping information 51, Host multipath state information 52, SAN zoning and network attribution information 53, and storage program 54. Further details of the host group mapping information 51, host multipath state information 52, and SAN zoning and network attribution information 53 can be found in the descriptions of FIGS. 6 to 8.

FIG. 6 illustrates a table of the Host Group mapping information 51, in accordance with an example implementation. Host Group mapping information 51 may include Host WWPN 61, Host LUN 62, Target Port WWPN 63, Internal LUN 64. The Host WWPN 61 contains host port name identifier (WWPN) to mapping from storage internal LU 64 to Host LUN 62. The Host Group mapping information 51 can be utilized to allow multiple hosts to share a storage target port with access control and LU Number mapping.

Figure 7:
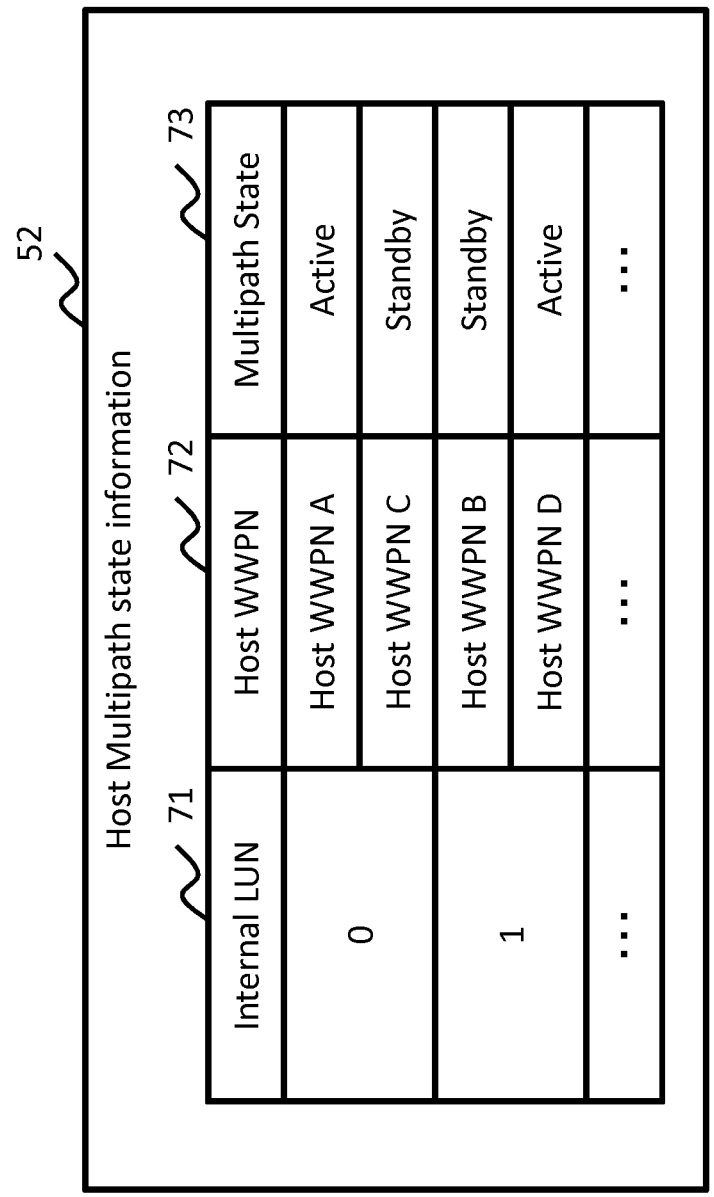
FIG. 7 illustrates a table of the Host multipath state information, in accordance with an example implementation.

FIG. 7 illustrates a table of the Host multipath state information 52, in accordance with an example implementation. The Host multipath state information 52 may include internal LUN 71, Host port WWPN 72, and Multipath State 73. The Host multipath state information 52 enables that a target port share multiple of Multipath State 73. When the storage volume is migrated to another target port, other volumes that are allocated on the same target port are not affected by the volume migration.

FIG. 8 illustrates a table of the SAN zoning and network attribution information 53, in accordance with an example implementation. The storage program 54 may obtain the SAN zoning and network attribute information 53 from the management client or the SAN switch. The target port WWPN is principal target port. The peer zoning has access control between principal target port and Peer WWPNs, but does not have access control between Peer WWPNs. SAN zoning and network attribution information 53 may include the Zone Name 81, Target Port WWPN 82, Peer WWPN list 83, and Network Attribute list 84. The Zone Name 81 is a string character and separates other Zone Name configurations of the peer zoning list and the network attribute list. For example, if host A and host B have different NW attribute for the same target port X, two Zone Name configurations for one target port X can be used. The Peer WWPN list 83 contains the Host WWPN list to access control between Target Port WWPN and Peer WWPNs 83.

The Network Attribute List 84 may include QoS information, Traffic isolation information or other NW configurations.

Figure 9:
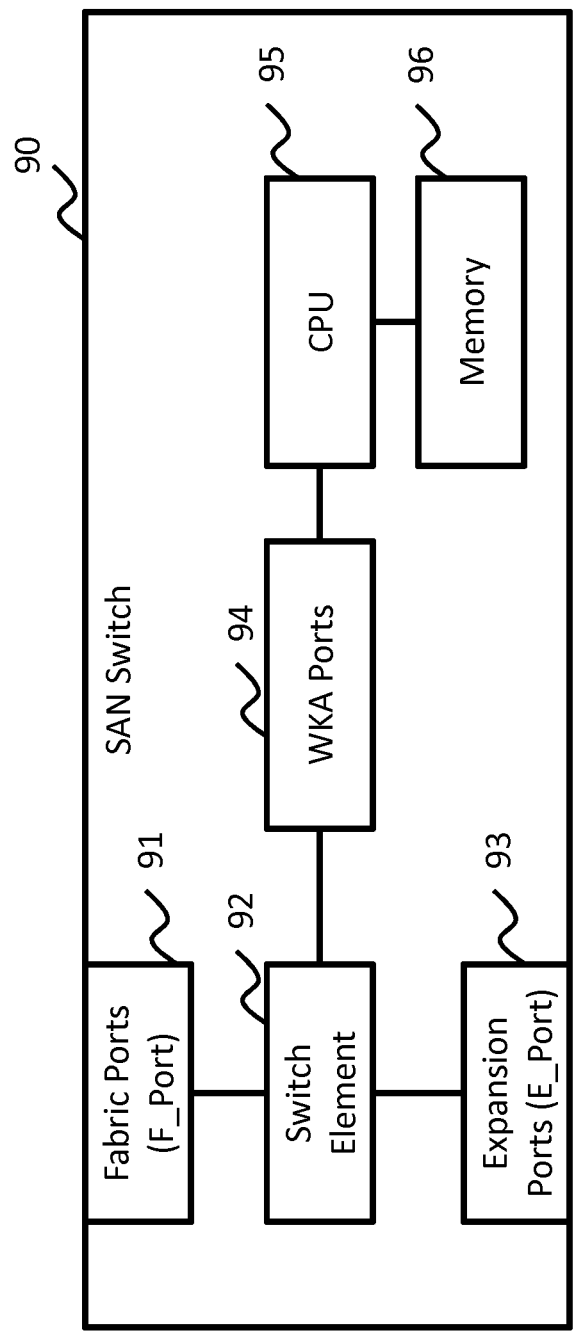
FIG. 9 illustrates a SAN switch, in accordance with an example implementation.

FIG. 9 illustrates a SAN switch 90, in accordance with an example implementation. The SAN 2 may have one or multiple SAN Switches 90. The SAN Switch 90 may include one or more Fabric Ports (F_Port) 91, a Switch Element 92, one or more Expansion Ports (E_Port) 93, one or more Well Known Address (WKA) Ports 94, a CPU 95 and a Memory 96. The Fabric Port (F_Port) 91, Expansion Port (E_Port) 93 and Well Known Address (WKA) Ports 94 are connected to Switch Element 92 by an internal bus. The Fabric Port (F_Port) 91 is connected to the Node Port (N_Port). The Expansion Port (E_Port) 93 is connected to E_Port of another SAN Switch.

The Well Known Address (WKA) Ports 94 are used to access the SAN service program. For example, WKA 0xFFFFFC is Directory Service, which contains the name server. WKA 0xFFFFFA is management service, which contains a Fabric Configuration Server for topology management, a Fabric Zoning Server for zoning configuration, and an Unzone Name server for query un-accessible Node Ports.

Figure 10:
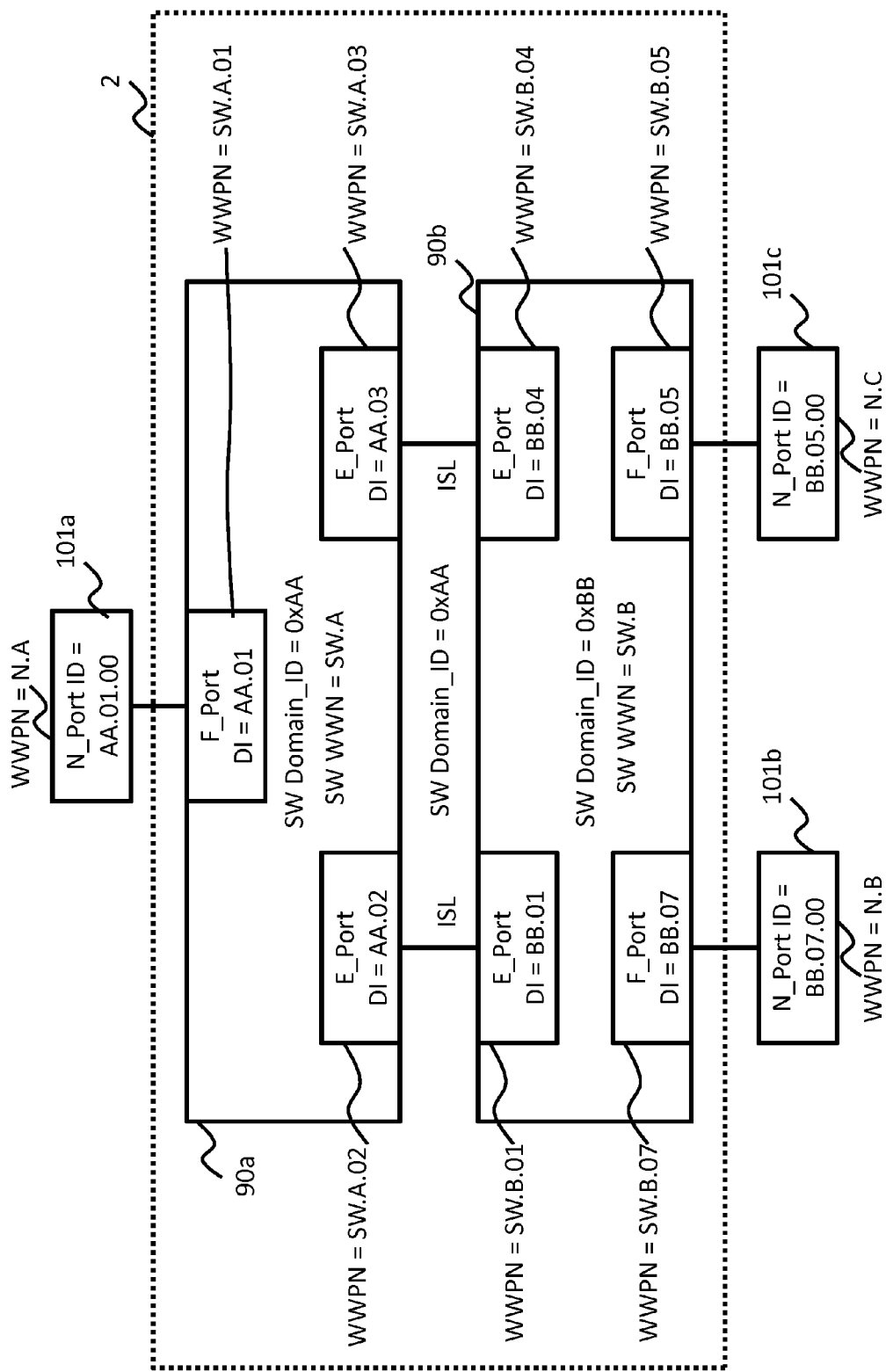
FIG. 10 illustrates a SAN 2 in accordance with an example implementation.

FIG. 10 illustrates a SAN 2 in accordance with an example implementation. The example SAN 2 includes two SAN switches 90a and 90b. The two switches connect three Node Ports (N_Port) 101a, 101b and 101c. The ISL (Inter Switch Link) is a connection of the E_Port to the E_Port link and can be used for trunking. Each switch has a unique Domain_ID in the SAN fabric. Each port (E_Port, F_Port, N_Port) has a unique WWPN.

The switch port (E_Port, F_Port) has a Domain/Port Index (DI) number. The DI number is concatenated by a one byte Domain_ID and 1 Bytes Port Index (physical switch port location). The N_Port ID has a N_Port Identifier (NPID). The NPID is assigned by a SAN switch name server when the N_Port ID requests a login (FLOGI or FDISC) to the name server of the directory service.

Figure 11:
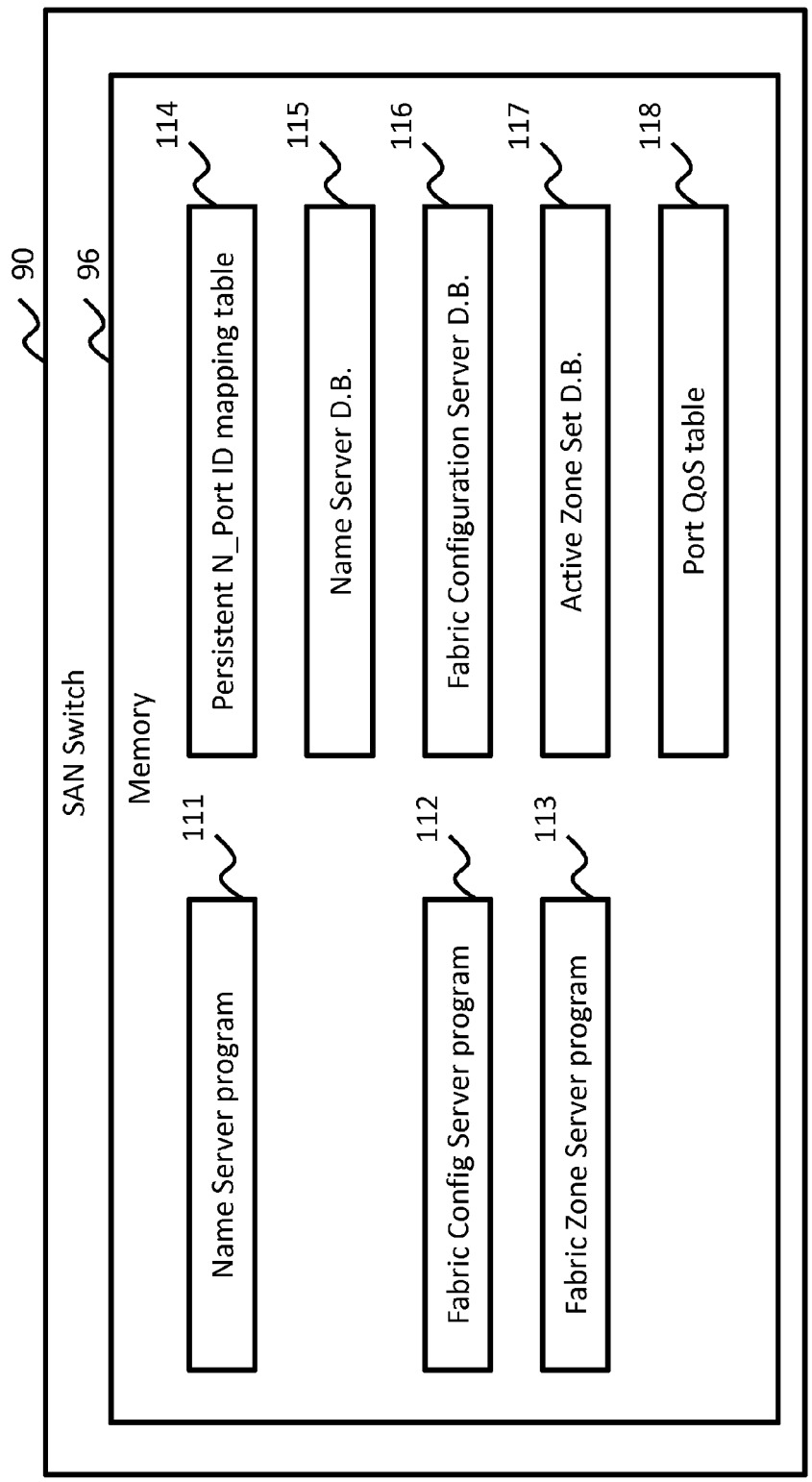
FIG. 11 illustrates a memory of a SAN switch, in accordance with an example implementation.

FIG. 11 illustrates a memory 96 of a SAN switch 90, in accordance with an example implementation. The memory 96 of SAN switch 90 may include a name server program 111, a Fabric Configuration Server program 112, a Fabric Zone Server program 113, a Persistent N_Port ID mapping table 114, a Name Server Database (DB) 115, a Fabric Configuration Server DB 116, an Active Zone Set DB 117, and a Port QoS Table 118. The name server program 111 allocates N_Port ID to N_Port and registers the Name Server DB 115 when the N_Port issues a Fabric Login or a Fabric Discovery (FLOGI or FDISC) request to the Name Server 111 of the Directory Server. The name server program 111 allocates static NPID to specific WWPN of N_Port, when N_Port issues login requests and the name server program 111 searches the Persistent N_Port ID mapping table 114 for a corresponding entry.

The name server program 111 also de-allocates N_Port ID from N_Port and deregisters from the Name Server DB 115 when the N_Port issues a Fabric Logout (FLOGO) request to the Name Server 111 of the Directory Server. The Fabric Configuration Server program 112 gathers topology information and stores them into the Fabric Configuration Server DB 116. The administrator can configure the Active Zone Set DB 117 and the Port QoS Table 118 for SAN switch 90 by using a management client 5.

The Fabric Zone Server program 113 forwards the data of the Active Zone Set DB 117 to all of the SAN switches and configures the setup of the zone configuration and network configuration for the F_Port or the E_Port. The SAN Switch 90 configures the setup of the Port QoS Table 118 to F_Port or E_Port for limiting ingress or egress rate performance.

FIG. 12 illustrates a Persistent N_Port ID mapping table 114, in accordance with an example implementation. The Persistent N_Port ID mapping table 114 may include a N_Port WWPN field 121 and a Persistent N_Port ID field 122. When a N_Port login with N_Port WWPN parameter to F_Port of SAN Switch 90 is conducted, the Name server program 111 searches the N_Port WWPN 121. If a corresponding entry is found, the Name server program 111 allocates NPID to N_port of the persistent N_Port ID 122. The allocated N_Port ID is not related to the Physical Port Index of SAN switch 90.

FIG. 13 illustrates a Name server DB 115, in accordance with an example implementation. The Name server DB 115 may include a F_Port Domain/Port Index entry 131, an allocated N_Port ID entry 132, a N_Port WWPN entry 133, and a Persistent N_Port ID allocated field 134. The F_Port Domain/Port Index entry 131 indicates the F_Port physical location of the SAN Switch 90. The allocated N_Port ID entry 132 is the allocated N_Port ID by the name server program 111 to the N_Port requesting a login. The N_Port WWPN field 133 includes the N_Port WWPN from the N_Port requesting a login.

The Persistent N_Port ID allocated field 134 indicates whether the allocated N_Port ID is related or not related based on referring to the Persistent N_Port ID mapping table 114.

FIG. 14 illustrates a Fabric Configuration Server DB 116, in accordance with an example implementation. The DB 116 contains topology, location, and peer connection information that connects to the adjacent switch or peer N_Port information.

Figure 15:
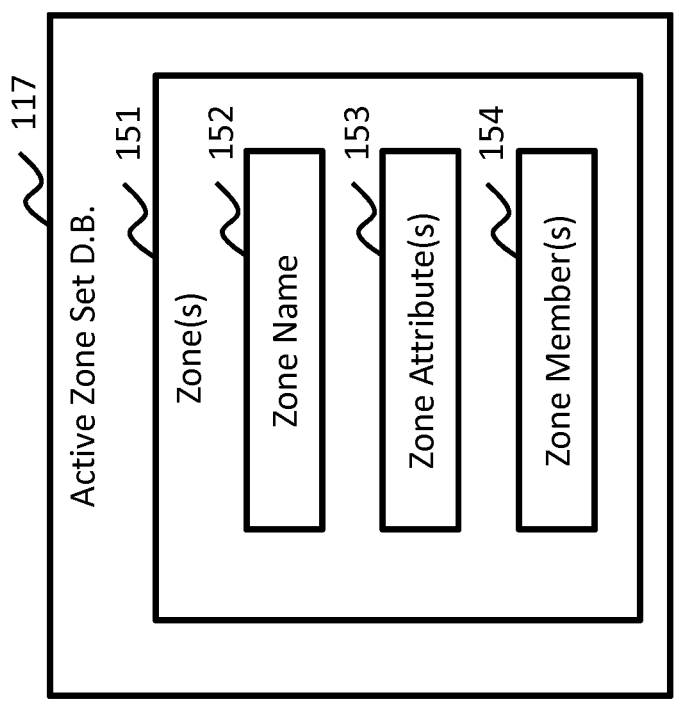
FIG. 15 illustrates an Active Zone Set DB 115, in accordance with an example implementation.

FIG. 15 illustrates an Active Zone Set DB 117, in accordance with an example implementation. The Active Zone Set DB 117 includes one or more Zones 151. Each Zone 151 may include Zone Name 152, optionally one or more Zone Attributes 153, and one or more Zone members 154. The Active Zone Set DB 117 is the effective zone set of the zone DB. Each Zone 151 is grouped by zone attributes 153 and zone members 154. The Zone Attribute 153 contains parameters such as a hard zoning attribute, peer zoning attribute, and/or vendor specific attributes such as QoS parameters or network attributes.

The Zone Members may include parameters such as the switch E_Port or F_Port id (e.g. Domain/Port Index (DI), F_Port WWPN, E_Port WWPN), the Node Port ID (e.g., N_Port WWPN, N_Port Node Name Identifier (World Wide Node Name: WWNN)), and/or the N_Port ID, which is changed based on a login to F_Port DI.

Figure 16:
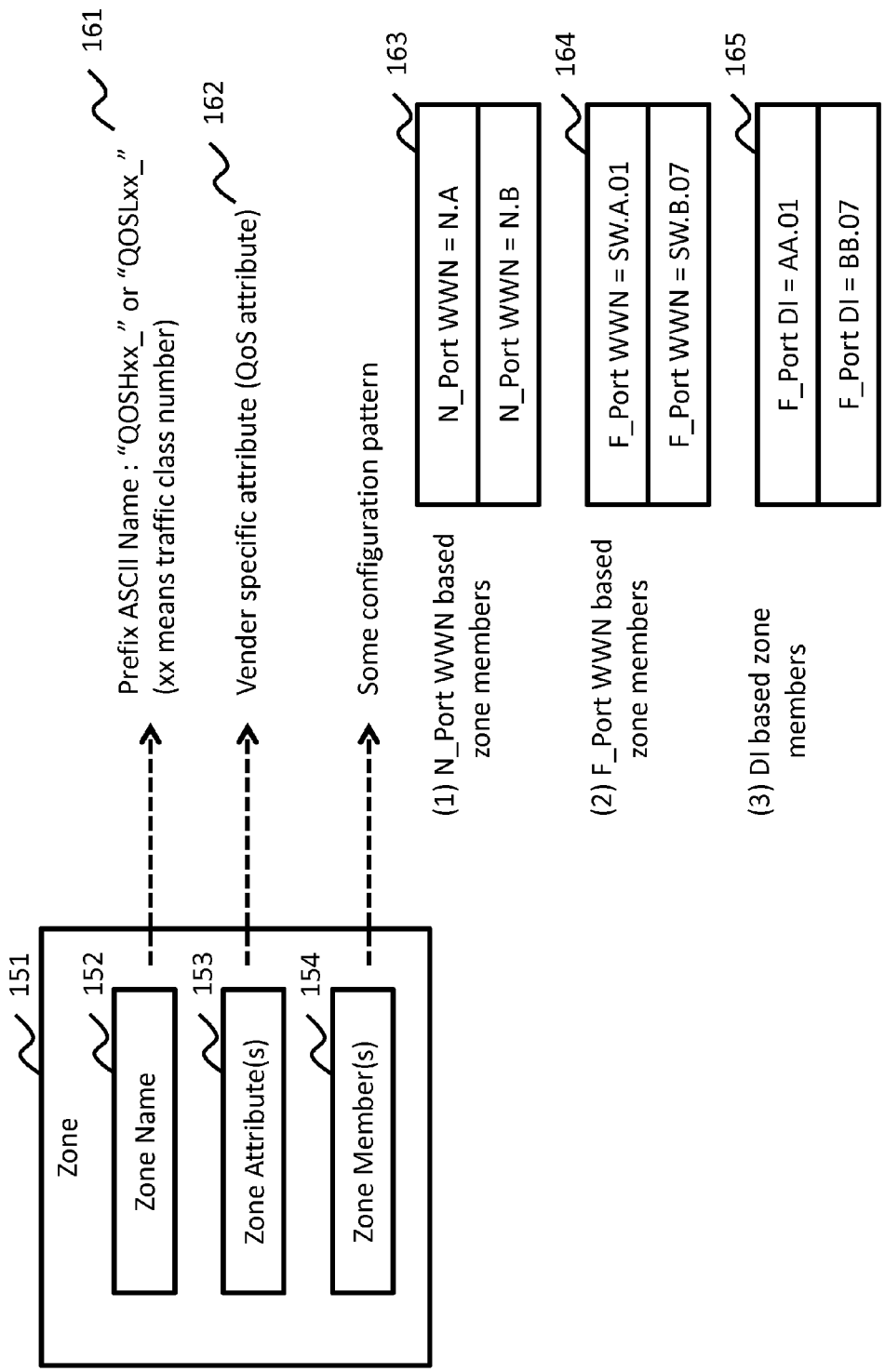
FIG. 16 illustrates a Zone Configuration for QoS, in accordance with an example implementation.

FIG. 16 illustrates a Zone Configuration for QoS, in accordance with an example implementation. The Zone Name 152 contains an ASCII zone name. To identify the QoS Zoning the by SAN switch, the Prefix ASCII Character of the Zone Name 152 contains prefixes such as "QOSHIxx_" or "QOSLOxx_" 161. The ASCII string indicates the QOS zoning mode and priority value (e.g. High/Low priority). The Zone Attribute 153 contains QoS Attribute if defined by SAN Switch vender specific. The Zone member 154 contains parameters such as the N_Port WWN based Zone members 163 which contains the N_Port WWPN of host ports and storage ports, the F_Port WWN based Zone members 164 which contains F_Port WWPN attached N_Port of host ports and storage target ports, the F_Port DI based Zone members 165 which contains F_Port Domain/Port Index attached N_Port of host ports and storage target ports, and can be in an intermix parameter format 163, 164 or 165. The Zone enables QoS priority setting within Zone Members 154.

If Zone members 154 contain N_Port WWN based Zone members 163, NPIV VN_Port migration may be performed successfully, but the network attributes (Prefix Zone Name 161 and/or QoS Attribute 162) cannot takeover. If Zone members 154 contain F_Port WWN based Zone members 164 or F_Port DI based Zone members 165, NPIV VN_Port migration cannot be performed since the VN_Port is migrated other PN_Port, the F_Port is changed and the F_Port WWPN or F_Port ID is changed. Thus, the VN_Port is out of the access list defined by the Zone Member 154.

Figure 17:
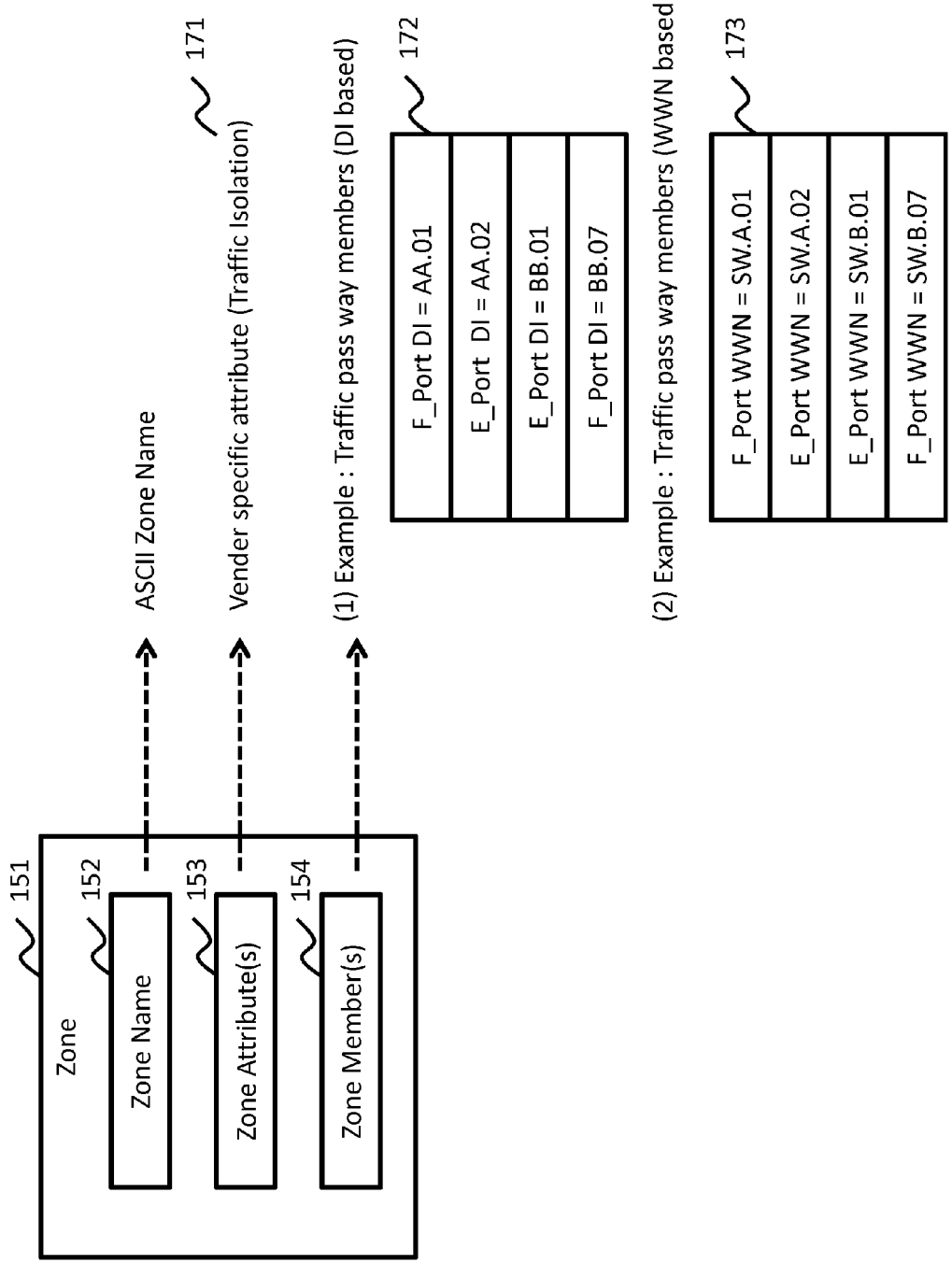
FIG. 17 illustrates a Zone Configuration for Traffic isolation, in accordance with an example implementation.

FIG. 17 illustrates a Zone Configuration for Traffic isolation, in accordance with an example implementation. The Traffic Isolation defines the traffic pathway of the SAN switch port (F_Port or/and E_Port). The Zone Name 152 includes an ASCII zone name or a Prefix ASCII zone name if the zone name is defined by a SAN switch, and can be vendor specific. The Zone Attribute 153 includes Traffic Isolation Attribute 171 if defined by the SAN Switch, and can be vendor specific. The Zone member 154 may include parameters such as a F_Port WWN based Zone members 172 which contains the F_Port WWPN attached to the N_Port of the host ports and storage target ports, F_Port DI based Zone members 173 which contains the F_Port Domain/Port Index attached to the N_Port of the host ports and the storage target ports, and can be in an intermix parameter format 172 or 173.

The Zone allows for Traffic Isolation setting within Zone Members 154. If the Zone 151 is made of traffic isolation attributes, then NPIV VN_Port migration cannot be performed since the VN_Port is migrated to another PN_Port, the F_Port is changed and the F_Port WWPN or F_Port ID is changed. Thus, the VN_Port is out of the access list defined by Zone Member 154.

FIG. 18 illustrates a Port based QoS table 115 for the SAN Switch physical port of the E_Port or the F_Port, in accordance with an example implementation. The Port based QoS table 115 can include a Domain/Index of F_Port or E_Port entry 181, a Rate Limit field 182, a Traffic Class (TC) field 183 and a virtual Channel (VC) field 184. The Network attribute contained in Port QoS Table 116 cannot takeover after NPIV VN_Port migration, because the Domain/Index of F_Port or E_Port is changed after VN_Port NPIV migration.

Figure 19:
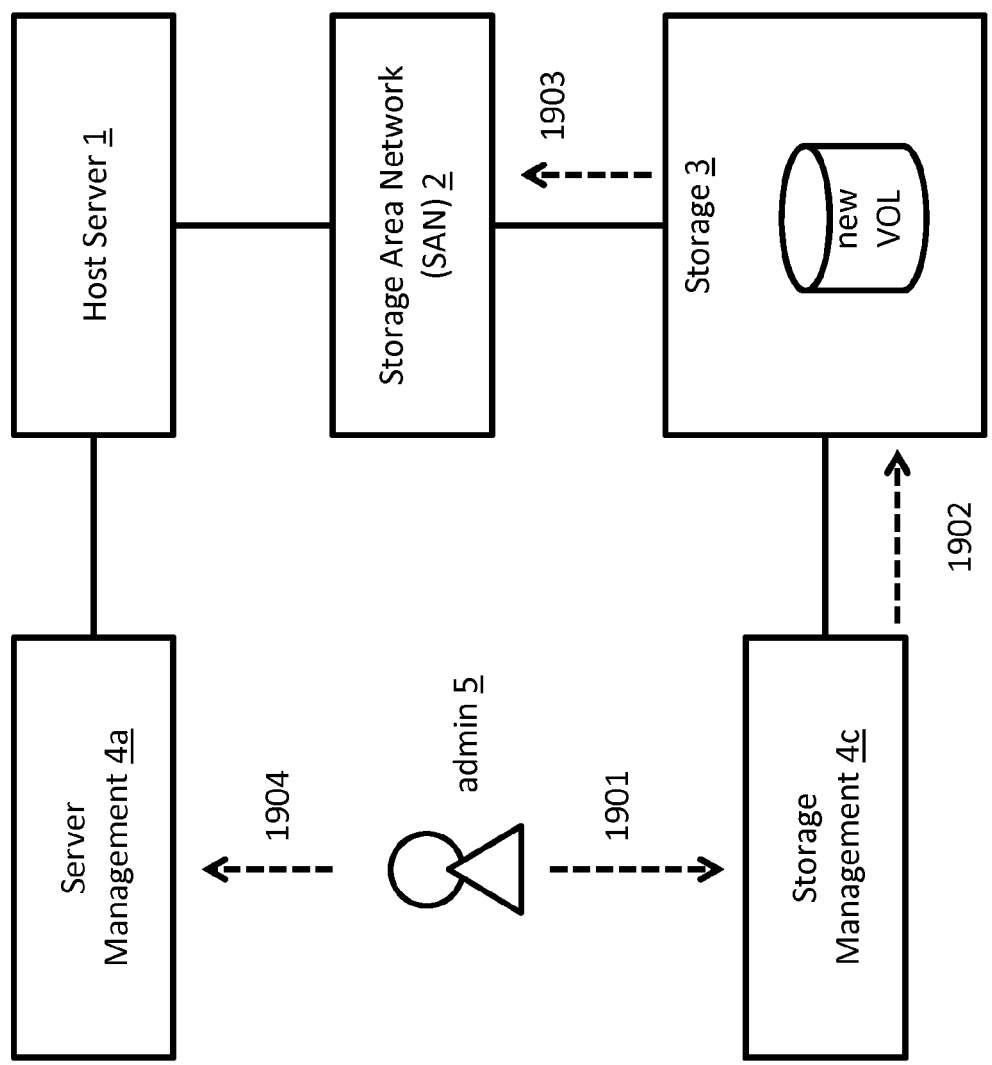
FIG. 19 illustrates a flowchart for creating new volume with network configuration (zone and SAN QoS, etc), in accordance with an example implementation.

FIG. 19 illustrates a flowchart for creating new volume with network configuration (zone and SAN QoS, etc), in accordance with an example implementation. When a storage administrator creates a volume, the storage management client creates a new zone to the network and the network configuration without SAN administrator coordination. At 1901, the administrator 5 creates a volume and issues a command to tie the storage port to the volume, and create host group (LUN Masking) information to accept from the host port to the storage port related to the volume. The administrator 5 also allocates network attributes such as QoS to the path of the host and the volume. At 1902, the management client 5c transfers the configuration to the storage 3. The storage 3 saves the network attribute information to SAN zoning and network attribute information table 53. At 1903, the storage target port creates a new zone ACL with network attribute information to provide access between the host port and the storage target port. The Zone ACL contains zone attributes, including network QoS information. The storage port issues a Peer Zoning request (e.g., AAPZ: Add Update Active Peer Zone) with network attribute information to the SAN Switch, then SAN Switch appends the zone to the Active Zone Set DB and the SAN Switch 2 configures network parameter such as QoS and so on. At 1904, the Server administrator 5 starts an application to the host server.

Figure 20:
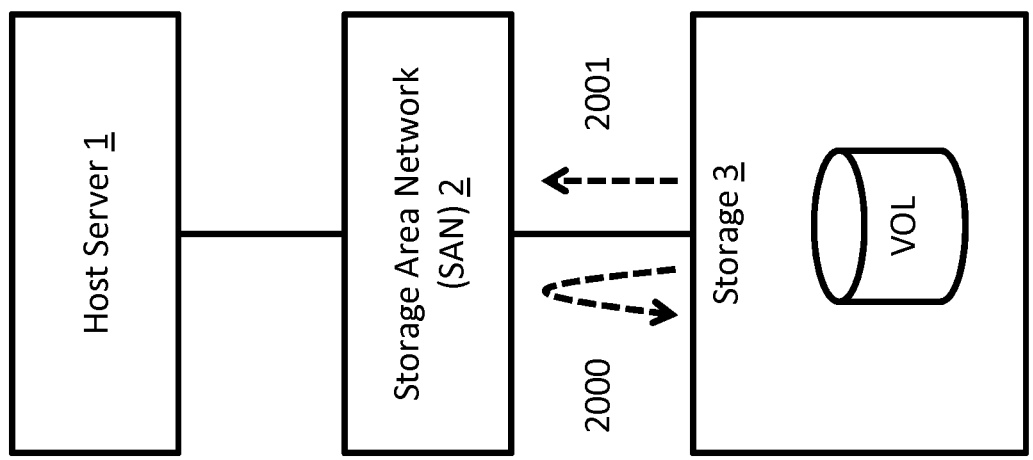
FIG. 20 illustrates a flow diagram of the operation of translating the zone object format without stopping the host application, in accordance with an example implementation.

FIG. 20 illustrates a flow diagram of the operation of translating the zone object format without stopping the host application, in accordance with an example implementation. At 2000, the storage program 54 issues a CT request (basic zoning or enhanced zoning command to fabric zoning server) to retrieve zone information from the SAN switch, and then the storage program translates the zone object format from a Basic/Enhanced zone to a Peer Zone of the EZ format to prepare a Peer Zone request. The storage 3 saves the network attribute information to SAN zoning and network attribute information table 53. At 2001, the storage program issues Peer Zone request (AAPZ CT_IU) with network attribute information to switch. The SAN Switch 2 appends the zone in the Active Zone Set Database, wherein the storage program 54 issues the CT request (basic zoning or enhanced zoning command to fabric zoning server) to delete existing old zone information from the SAN switch if any other volume or any active access path is unavailable. The storage program 54 computes which zone can be deleted when the storage program refers to the SAN zoning and network attribution information 53. The SAN Switch 2 do not change network parameter such as QoS and so on because only zone format is changed, network parameter is not changed.

Figure 21:
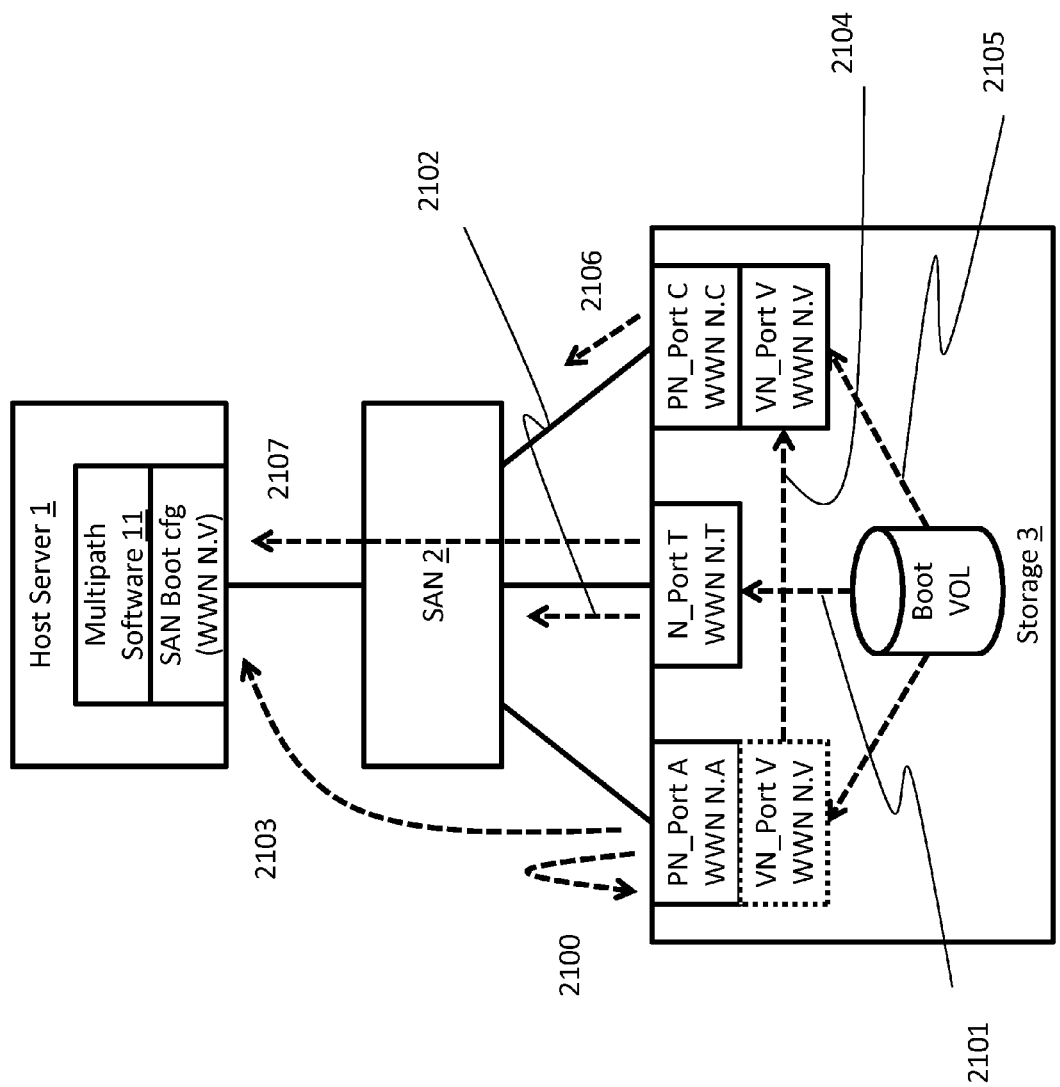
FIG. 21 illustrates a movement of a storage port that configured the SAN Boot Volume, to prevent changes to the SAN boot configuration in the Host Server, in accordance with an example implementation.

FIG. 21 illustrates a movement of a storage port that configured the SAN Boot Volume, to prevent changes to the SAN boot configuration in the Host Server, in accordance with an example implementation. The Host server sets up the SAN boot configuration to the storage target port (VN_Port V/WWPN N.V). A takeover is conducted to takeover the relationship between the boot volume and the boot configuration.

At 2100, the storage program issues a request to the fabric zoning server to retrieve the zone information from the SAN switch. The storage program translates the zone object format from the Basic/Enhanced zone to the Peer Zone of the EZ format to issue a Peer Zone request. The storage 3 saves the network attribute information to SAN zoning and network attribute information table 53. At 2101, the Storage program creates a new I/O path for N_Port T. The boot volume in the storage is accessible by both N_Port T and VN_Port V. At 2102, the storage program issues a Peer Zone request (AAPZ CT_IU) to the SAN switch. The SAN Switch appends the zone between the host port and N_Port T in the Active Zone Set Database. When the SAN Switch updates the Active Zone Set DB, the Fabric Controller in the SAN Switch notifies the host server using a RSCN (Register State Change Notification) notification message. The SCSI driver of the Host Server then discovers a new I/O path between the host port and the storage port T.

At 2103, the VN_Port V of the storage target port sends a NOT READY or UNIT ATTENTION notification message of SCSI sense data of an Asynchronous Logical Unit Access (ALUA: is SCSI SBC-3 multipath standard), The multipath software of the Host Server sends a Report Target Port Group SCSI command and retrieves the Target Port Group information. The storage program changes the Host Multipath state information to add N_Port T with an active state setting and to add VN_Port V with an unavailable state setting. The storage program creates Target Port Group information payload from the Host Multipath state information. The Host multipath software changes the I/O path from VN_Port V to N_Port T.

At 2104, the storage program issues a Logout (LOGO) request to the F_Port Controller of the SAN Switch. The SAN switch then de-allocates and removes the VN_Port V N_Port ID from the name server. Then storage program the migrates the VN_Port V from PN_Port A to PN_Port C, wherein the N_Port Controller of PN_Port C issues a NPIV Fabric Discovery (FDISC) request. The name server of the SAN switch creates a VN_Port V instance and adds the N_Port ID for the VN_Port V in the name server DB.

At 2105, the storage program creates a new I/O path for N_Port V. The boot volume in the storage is accessible by both N_Port T and the new VN_Port V instance. At 2106, the storage program issues Peer Zone request (AAPZ CT_IU) with network attribute information to SAN switch 2. The SAN Switch 2 appends the zone between the host port and the VN_Port V in the Active Zone Set Database and the SAN Switch 2 configures network parameter such as QoS and so on. When the SAN Switch updates the Active Zone Set DB, the Fabric Controller in the SAN Switch sends a notification to the host server using a RSCN notification message. The SCSI driver of the Host Server conducts a new I/O path discovery between the host port and the storage VN_Port V.

At 2107, the N_Port T of the Storage target port sends a NOT READY or UNIT ATTENTION notification message of the SCSI Sense data of ALUA. The Multipath software of the Host Server sends a Report Target Port Group SCSI command and retrieves the Target Port Group information. The storage program changes the Host Multipath state information to add VN_Port V with an active state setting and N_Port T with an unavailable state setting. The storage program creates the Target Port Group information payload by using the Host Multipath state information. The host multipath software changes the I/O path from port T to VN Port V. The storage program issues a CT request (basic zoning or enhanced zoning command to fabric zoning server) to delete existing old zone information from the SAN switch if needed.

Figure 22:
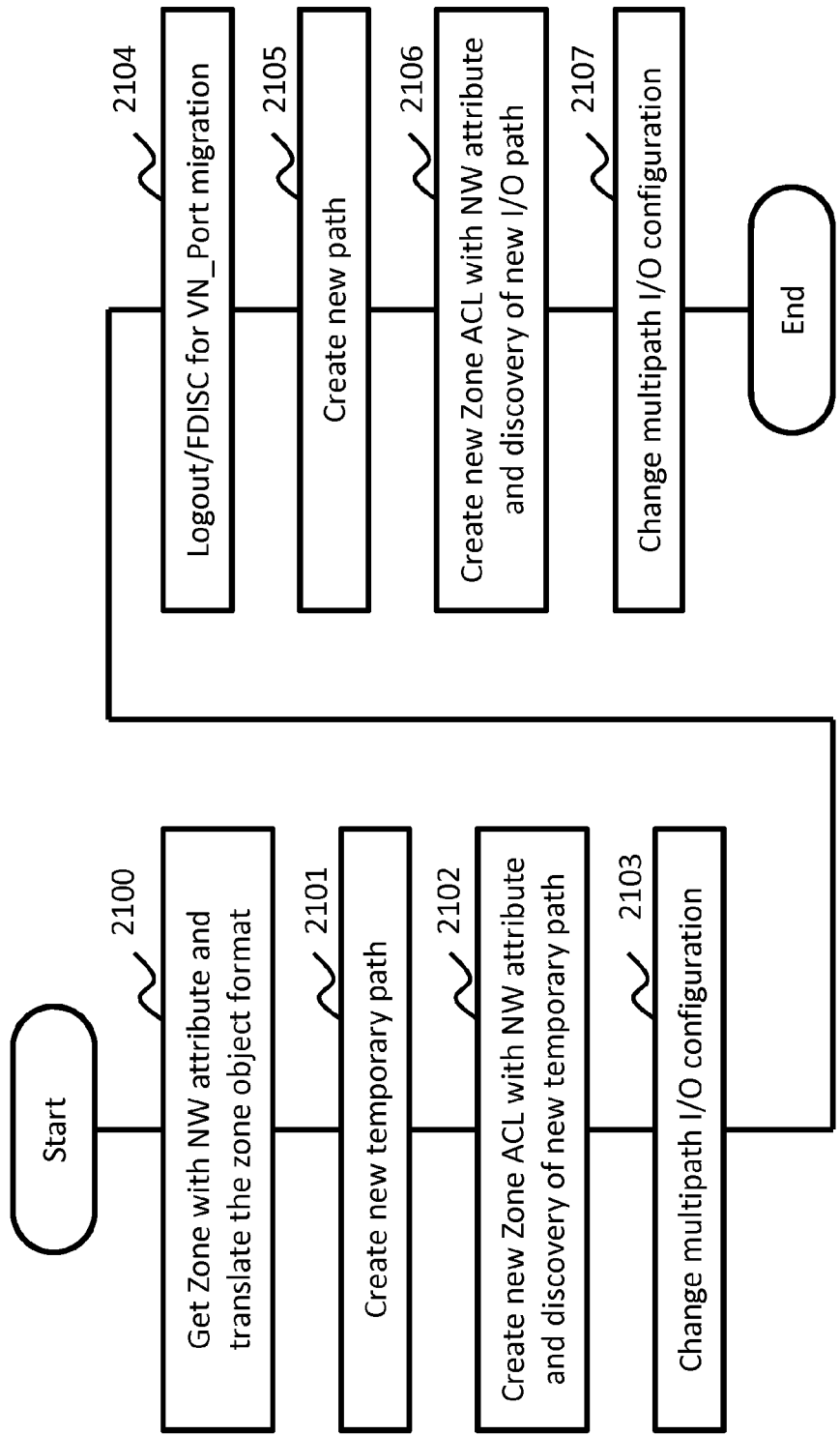
FIG. 22 illustrates the flowchart of FIG. 21.

FIG. 22 illustrates the flowchart of FIG. 21 with respect to the reference elements used in FIG. 21.

Figure 23:
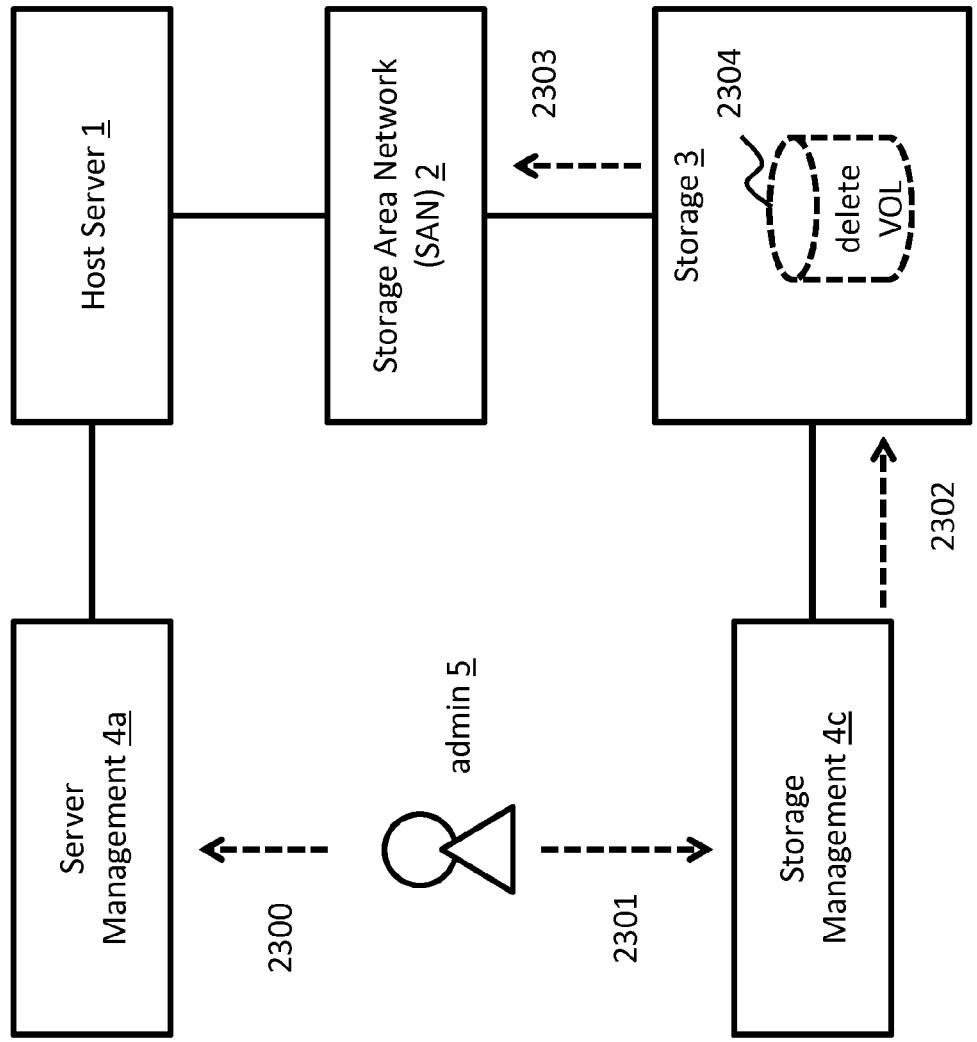
FIG. 23 illustrates a flow diagram for deleting a volume and a network configuration (zone and SAN QoS, etc), in accordance with an example implementation.

FIG. 23 illustrates a flow diagram for deleting a volume and a network configuration (zone and SAN QoS, etc), in accordance with an example implementation. When the storage administrator creates a volume, the storage management client creates a zone and network configuration without SAN administrator coordination. At 2300, the administrator stops the host server application. At 2301, the administrator 5 deletes the volume. At 2302, the management client 4c transfers the configuration to the storage. At 2303, the storage program deletes the volume and/or unmaps the connection between the port and the volume. The storage program issues a DAPZ (Delete Active Peer Zone) request to delete the zone with network attribute information between host port and storage port, if other volumes do not use the zone when the storage program search SAN zoning information 53. Then, the storage 3 delete specific entry of the network attribute information from SAN zoning and network attribute information table 53, if needed.

Figure 24:
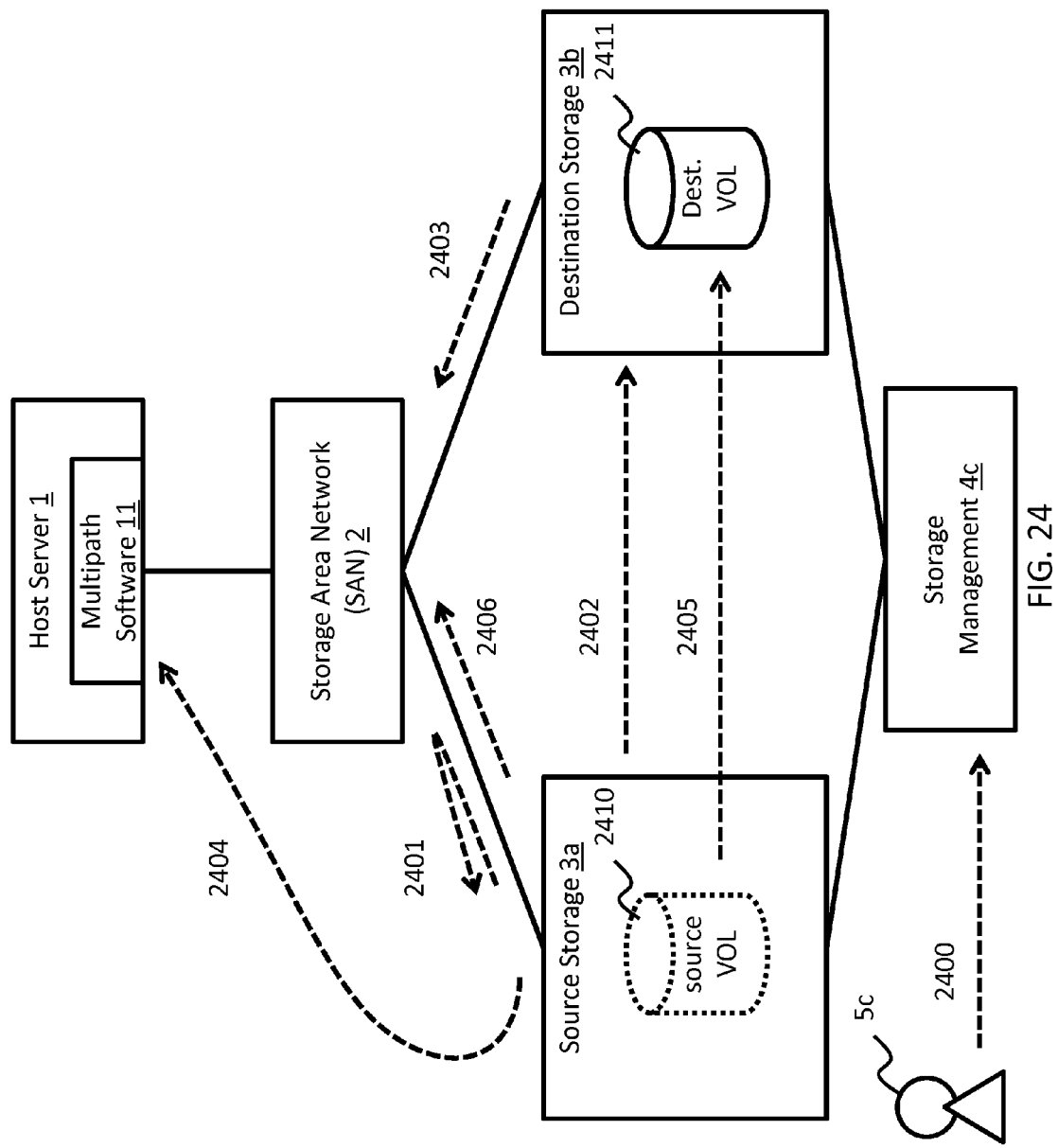
FIG. 24 illustrates a flow diagram for a host I/O non-disruptive volume migration with takeover of the SAN zoning and network configuration, in accordance with an example implementation.

FIG. 24 illustrates a flow diagram for a host I/O non-disruptive volume migration with takeover of the SAN zoning and network configuration, in accordance with an example implementation. At 2400, storage administrator 5c indicates volume migration operation. At 2401 the source storage program issues a request to the fabric zoning server to retrieve zone info from the SAN switch. Then the source storage program translates the zone object format from the Basic/Enhanced zone to the Peer Zone of the EZ format to issue a Peer Zone request if format translation is needed. The source storage 3a saves the network attribute information to SAN zoning and network attribute information table 53. At 2402, both of the storage programs send or retrieve the Peer Zone information and network attribute information from the Source Storage to the Destination Storage via the interconnect storage path. At 2403, the storage program issues a Peer Zone request (AAPZ CT_IU) with network attribute to the SAN switch 2. The SAN Switch 2 appends the zone between the host port and the N_Port T in the Active Zone Set Database and the SAN Switch 2 configures network parameter such as QoS and so on. When the SAN Switch updates the Active Zone Set DB, the Fabric Controller in the SAN Switch sends a notification to the host server using a RSCN (Register State Change Notification) notification message. The SCSI driver of the Host Server conducts a new I/O path discovery between the host port and the storage port T.

At 2404, the destination storage mounts the source volume of the source storage. The source storage target port sends a NOT READY or UNIT ATTENTION notification message of the SCSI Sense data of the ALUA. The multipath software of the Host Server sends a Report Target Port Group SCSI command and retrieves the Target Port Group information. The storage program changes the Host Multipath state information to add the destination storage port with an active state setting and the source storage port with an unavailable state setting. The storage program creates the Target Port Group information payload by using the Host Multipath state information. The Host multipath software changes the I/O path from the source storage port to the destination storage port.

At 2405, both storage programs execute to conduct boot volume migration. At 2406, the source storage program issues a CT request (a basic zoning or an enhanced zoning command to the fabric zoning server) to delete existing old zone information from the SAN switch if needed. Then, the source storage 3a delete specific entry of the network attribute information from SAN zoning and network attribute information table 53, if needed.

Figure 25:
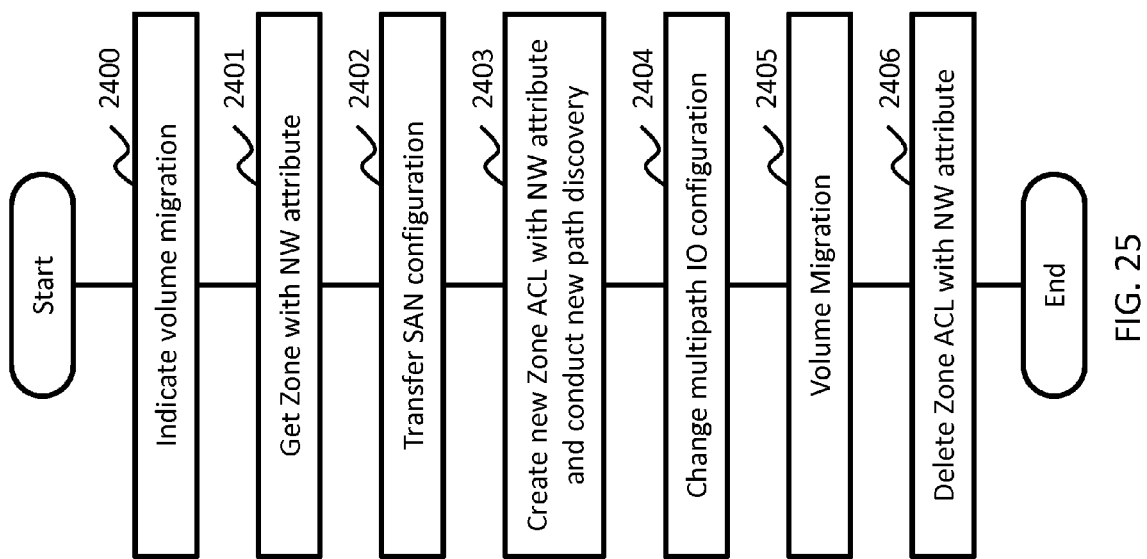
FIG. 25 illustrates a flow chart for the flow diagram of FIG. 24.

FIG. 25 illustrates a flowchart of the flow diagram of FIG. 24.

Figure 26:
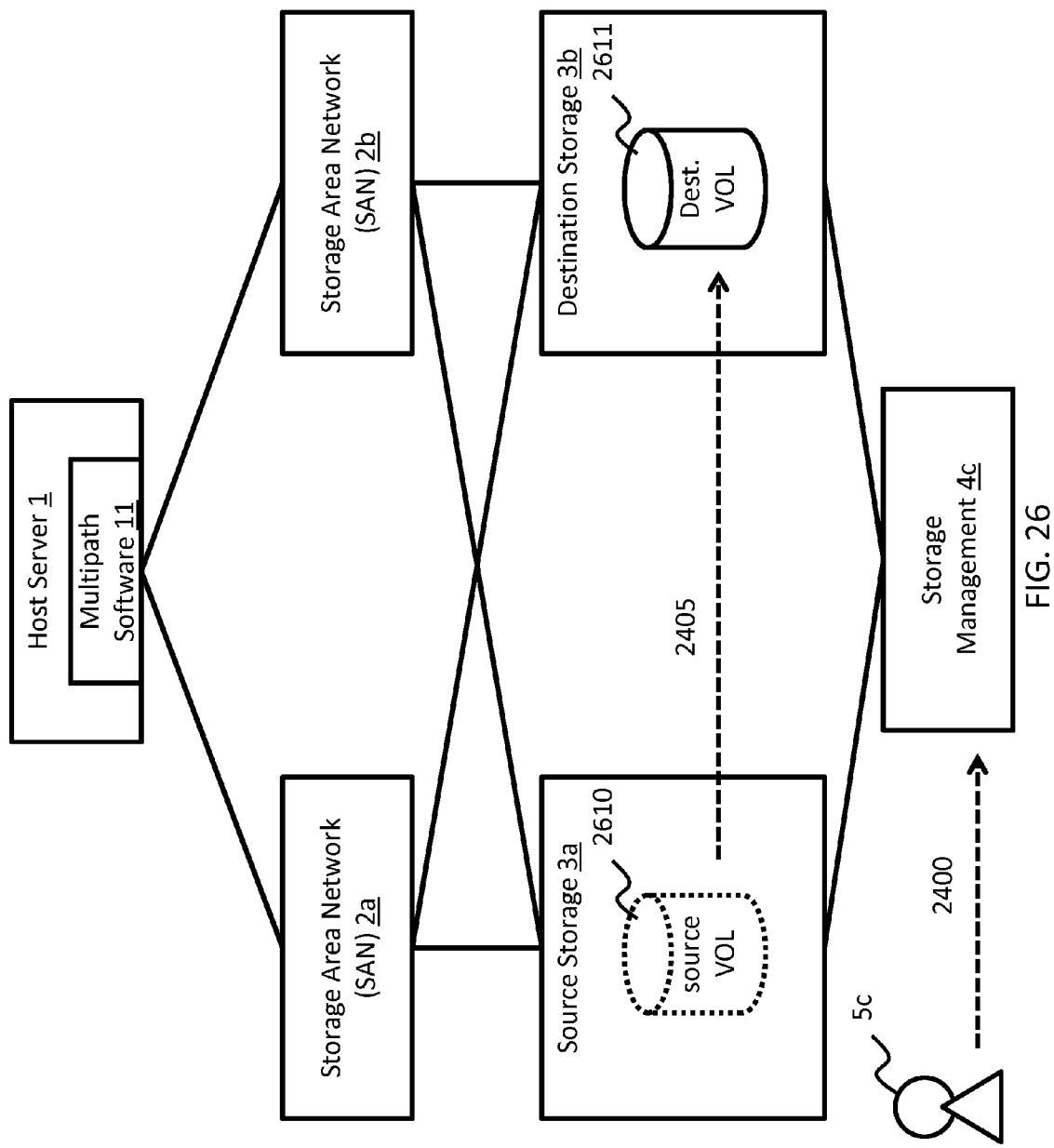
FIG. 26 illustrates the flow diagram of the volume granularity migration operation between storage systems, in accordance with an example implementation.

FIG. 26 illustrates the flow diagram of the volume granularity migration operation between storage systems, in accordance with an example implementation. The operation is similar to that of FIG. 24, but also includes redundant SANs 2a and 2b. Thus, if a SAN fails, the volume migration can be performed using another SAN, as multiple paths between the host server ports and the destination storage ports thereby exist and are active during the volume migration.

If NPIV takeover is conducted, the redundancy is lost between the Fabric Logout (LOGO) and new the Fabric Discovery (FDISC), because duplicate WWPN registration of the Name Server of the SAN Switch is not allowed. The Duplicated Address login request error is defined by FC-LS-2.

Figure 27:
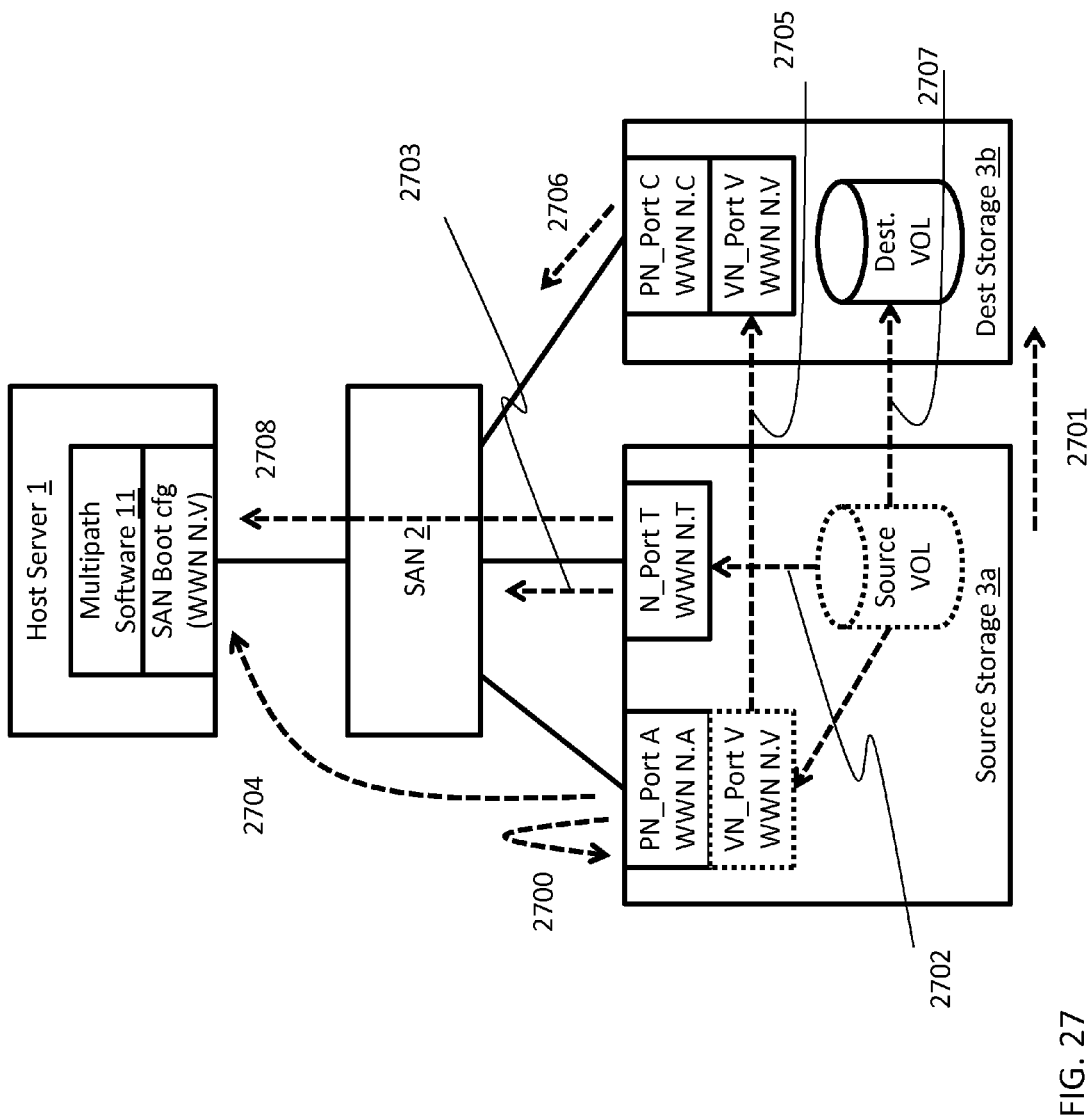
FIG. 27 illustrates a flow diagram for a storage moving a boot volume with a VN_Port V from PN_Port A to PN_Port C to prevent changes to the SAN boot configuration of the Host Server, in accordance with an example implementation.

FIG. 27 illustrates a flow diagram for a storage moving a boot volume with a VN_Port V from PN_Port A to PN_Port C to prevent changes to the SAN boot configuration of the Host Server, in accordance with an example implementation. In FIG. 27, the host server configures the SAN boot configuration to the storage target port (VN_Port V/WWPN N.V).

At 2700, storage administrator indicates volume migration operation. Then, the storage program issues a request to the fabric zoning server to retrieve zone information from the SAN switch. The source storage 3a saves the network attribute information to SAN zoning and network attribute information table 53. At 2701, the storage program translates the zone object format from the Basic/Enhanced zone to the Peer Zone of the EZ format to issue a Peer Zone request if format translation is needed. The storage program sends the Peer Zone information and network attribute information from the Source Storage 3a to the Destination Storage 3b via the interconnect storage path. At 2702, the storage program creates a new I/O path for the N_Port T. The boot volume in the storage is accessible by both N_Port T and VN_Port V. At 2703, the storage program issues the Peer Zone request (AAPZ CT_IU) to the SAN switch. The SAN Switch appends the zone between host port and the N_Port T in the Active Zone Set Database. When the SAN Switch updates the Active Zone Set DB, the Fabric Controller in the SAN Switch notifies the host server by using a RSCN (Register State Change Notification) notification message. The SCSI driver of the Host Server conducts new I/O path discovery between the host port and the storage port T.

At 2704, the VN_Port V of the storage target port sends a NOT READY or a UNIT ATTENTION notification message of the SCSI Sense data of the ALUA. The Multipath software of the Host Server sends a Report Target Port Group SCSI command and retrieves Target Port Group information. The storage program changes the Host Multipath state information to add N_Port T with an active state setting and VN_Port V with an unavailable state setting. The storage program creates the Target Port Group information payload by using Host Multipath state information. The host multipath software changes I/O path from VN_Port V to N_Port T.

At 2705, the storage program of source storage 3a issues a Logout (LOGO) request to the F_Port Controller of the SAN Switch. The SAN switch de-allocates the VN_Port V N_Port ID and removes the VN_Port V from the name server. The storage program migrates the VN_Port V from the PN_Port A of the source storage 3a to the PN_Port C of the destination storage 3b. The N_Port Controller of the PN_Port C of the destination storage 3b issues a NPIV Fabric Discovery (FDISC) request and the name server of the SAN switch 2 creates a VN_Port V instance and adds the N_Port ID for the VN_Port V in the name server DB.

At 2706, the storage program of destination storage 3b issues a Peer Zone request (AAPZ CT_IU) to the SAN switch 2. The SAN Switch 2 appends the zone between the host port and the VN_Port V in the Active Zone Set Database and the SAN Switch 2 configures network parameter such as QoS and so on. When the SAN Switch updates the Active Zone Set DB, the Fabric Controller in the SAN Switch notifies the host server by using a RSCN notification message. The SCSI driver of the Host Server conducts new I/O path discovery between the host port and storage VN_Port V.

At 2707, both storage programs conduct the boot volume migration. Both ports of Port C and Port T are accessible, so the source storage changes the access state to unavailable for port T and the destination storage changes the access state to available for VN_Port V. The destination storage mounts the source volume of the source storage and migrates the data.

At 2708, the N_Port T of the storage target port sends a NOT READY or a UNIT ATTENTION notification message of the SCSI Sense data of the ALUA, The multipath software of the Host Server sends a Report Target Port Group SCSI command and retrieves the Target Port Group information. The storage program changes the Host Multipath state information to add VN_Port V with setting active state and VN_Port T with setting unavailable state. The storage program creates the Target Port Group information payload by the Host Multipath state information. The Host multipath software changes the I/O path from N_Port T to VN_Port V.

Then the source storage program issues a CT request (e.g. a basic zoning or an enhanced zoning command to the fabric zoning server) to delete old existing zone information from the SAN switch if needed. Then, the source storage 3a delete specific entry of the network attribute information from SAN zoning and network attribute information table 53, if needed.

Figure 28:
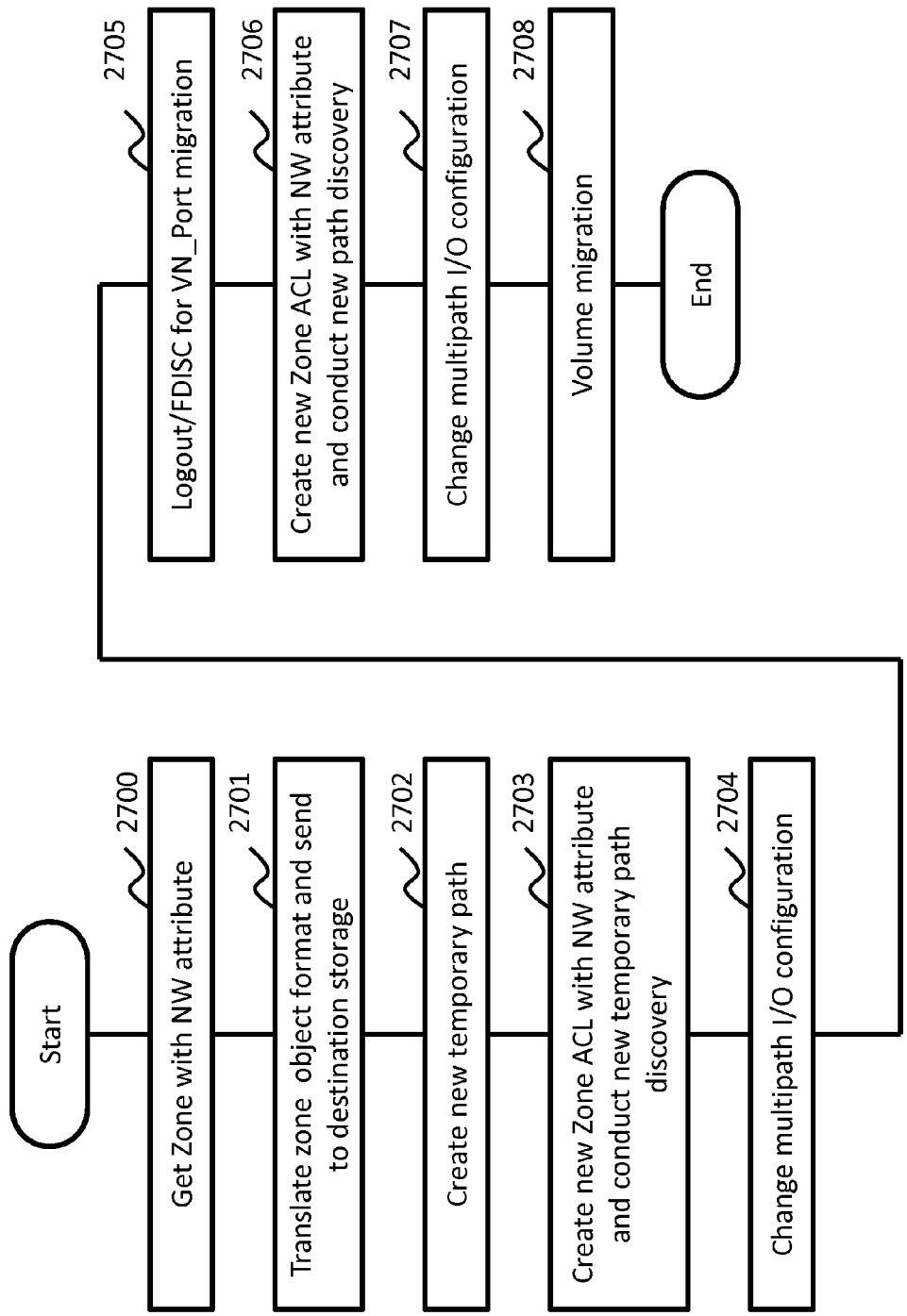
FIG. 28 illustrates the flow chart of the flow diagram of FIG. 27.

FIG. 28 illustrates the flow chart of the flow diagram of FIG. 27.

Figure 29:
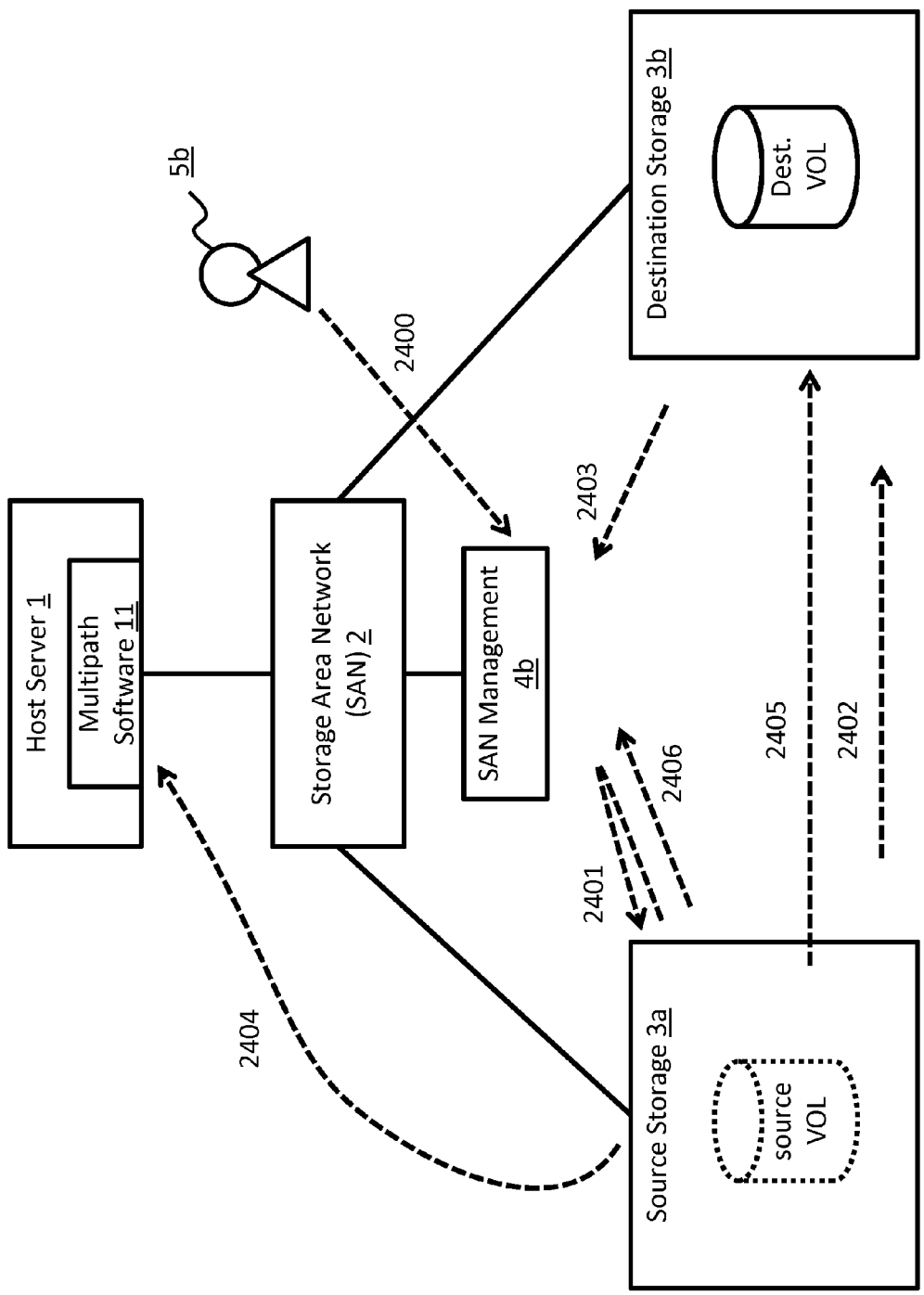
FIG. 29 illustrates an alternate example implementation of the flow diagram of FIG. 24.

FIG. 29 illustrates an alternate example implementation of the flow diagram of FIG. 24. In the alternate implementation of FIG. 29, a side-band storage management 4b that integrates storage and SAN management is utilized.

Figure 30:
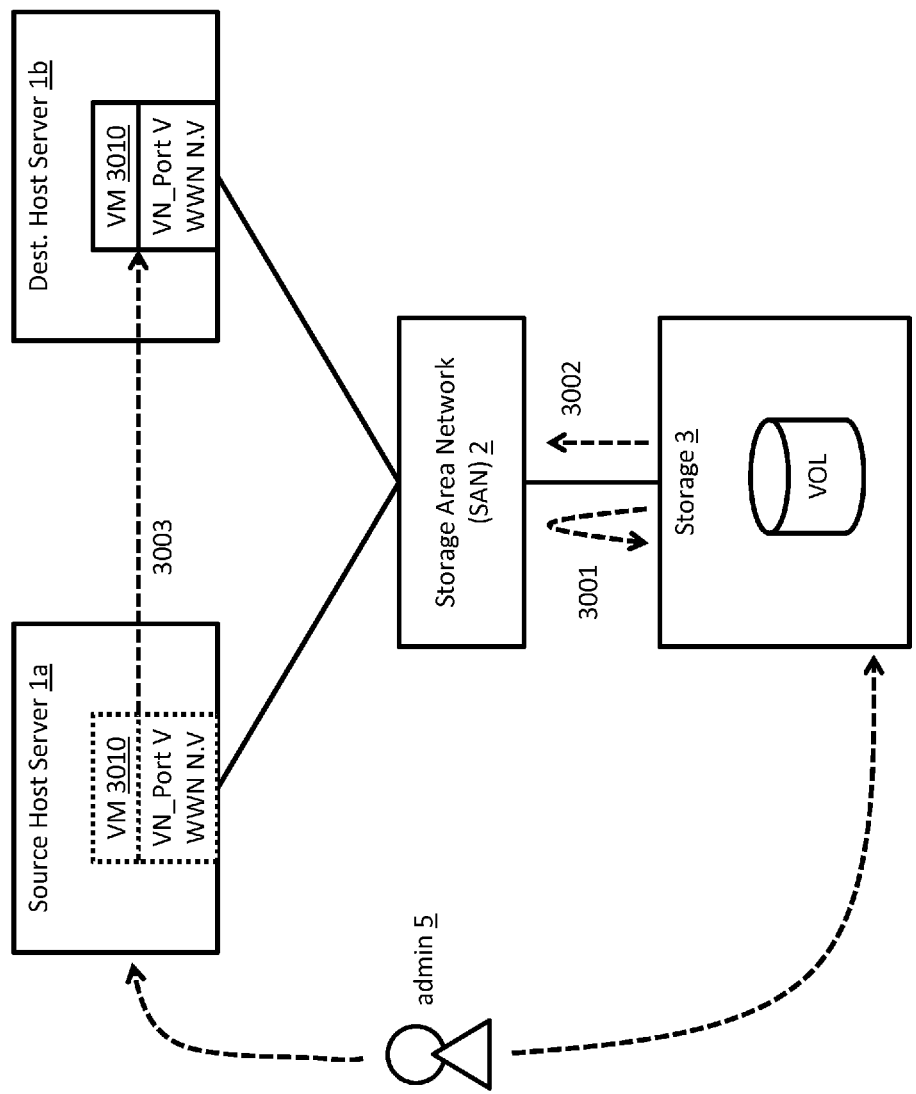
FIG. 30 illustrates a flow diagram for host virtual machine (VM) migration with a SAN zoning and network configuration takeover, in accordance with an example implementation.

FIG. 30 illustrates a flow diagram for host virtual machine (VM) migration with a SAN zoning and network configuration takeover, in accordance with an example implementation. The flow diagram is similar to FIG. 20. The SAN zoning configuration is N_Port ID based, so host VM migration is conducted.

At 3000, the administrator 5 submits an instruction for VM migration between the source physical host and the destination physical host. At 3001, the storage program issues a CT request (basic zoning or enhanced zoning command to fabric zoning server) to retrieve zone info from SAN switch. The storage program translates the zone object format from the Basic/Enhanced zone to the Peer Zone of the EZ format to prepare to issue a Peer Zone request to migrate the NPIV format (e.g., N_Port ID based or DI based, F_Port WWN based zone to Host N_Port WWPN based). At 3002, the storage program issues a Peer Zone request (AAPZ CT_IU) with network attribute information to the switch. The SAN Switch appends the zone to the Active Zone Set Database and network attribute information. At 3003, both host servers migrate the VM with the NPIV host port WWPN migration. The Storage program issues a CT request (e.g., basic zoning or enhanced zoning command to fabric zoning server) to delete existing old zone information from the SAN switch if any other volume or any active access path is unavailable. The storage program computes which zone can be deleted when the storage program refers to the SAN zoning and network attribution information.

Figure 31:
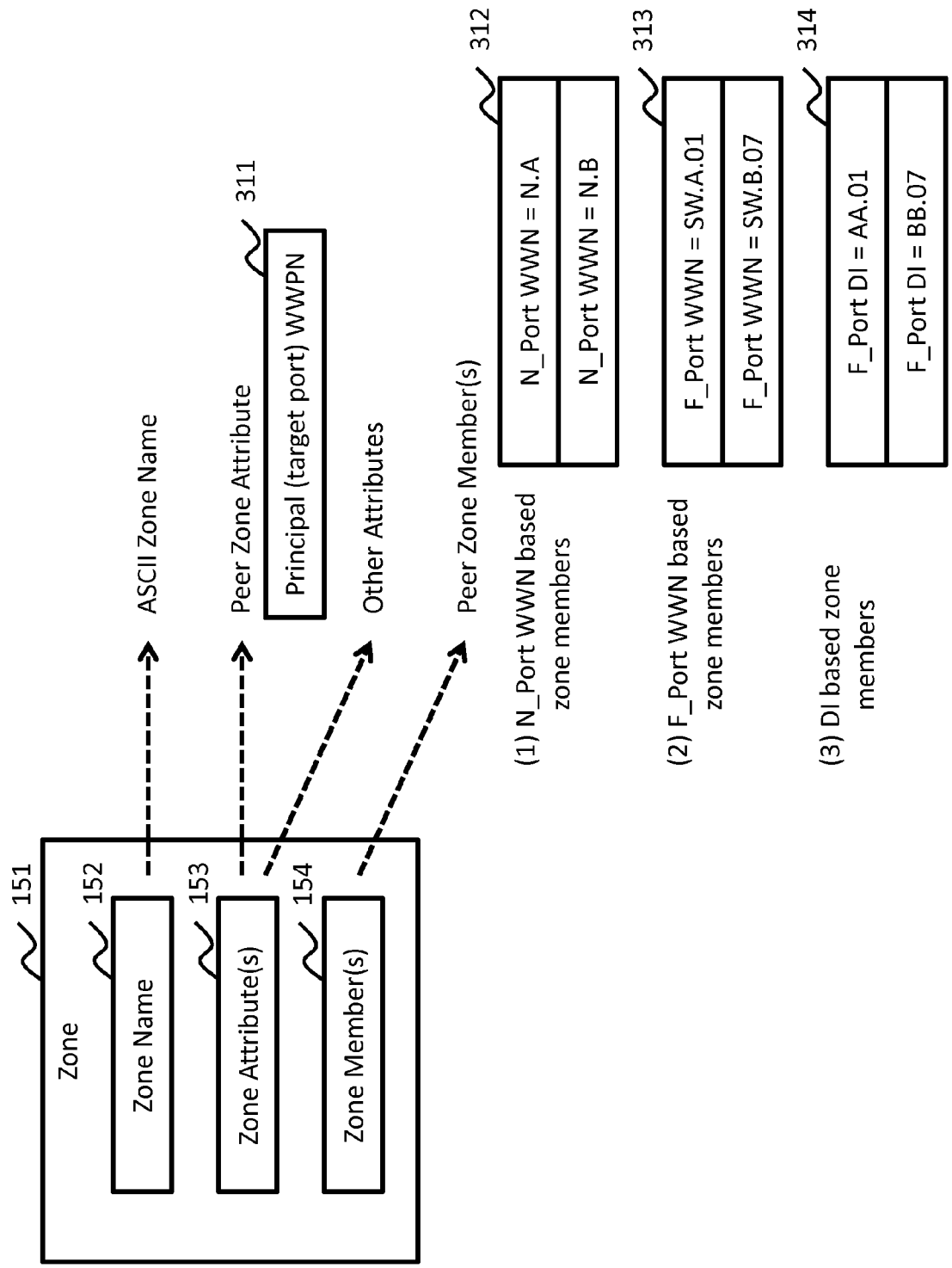
FIG. 31 illustrates the Peer Zone format the Active Zone Set DB, in accordance with an example implementation.

FIG. 31 illustrates the Peer Zone format the Active Zone Set DB 115, in accordance with an example implementation. The Peer Zone format may include a Zone Name 152, one or more Peer Zone Attributes 311, optionally one or more other zone attributes 153 and one or more Zone members 154. The Peer Zone attribute 311 contains target port WWPN. However, the Peer Zone members 312, 313, 314 do not include the target port (Peer Zoning principal port 311).

Moreover, other implementations of the invention will be apparent to those skilled in the art from consideration of the specification and practice of the invention disclosed herein. Various aspects and/or components of the described implementations may be used singly or in any combination. It is intended that the specification and implementation be considered as examples only, with a true scope and spirit of the invention being indicated by the following claims.

What is claimed is:

1. A storage system, comprising:
   an interface configured to receive a command from a computer for reading or writing data via a network; and
   a controller configured to:
      manage read or written data of a logical volume based on the command, and to manage a first relationship among information of an initiator port of the computer, information of the logical volume, and information of an attribute of the network used for transferring the command;
      create a new zone to the network based on the first relationship;

conduct an input/output (I/O) path discovery between the initiator port of the computer and a target port based on the new zone; and update the first relationship based on the I/O path discovery.

2. The storage system of claim 1, wherein the attribute of the network used for transferring the command comprises quality of service (QoS) information and traffic pathway information.

3. The storage system of claim 1, wherein the controller is configured to translate a zone object format.

4. The storage system of claim 1, wherein the controller is configured to take over a second relationship between a boot configuration and a boot volume, wherein the target port is associated with the boot volume and wherein the controller is configured to facilitate access to the boot volume based on the I/O path discovery.

5. The storage system of claim 4, wherein the controller is configured to take over the second relationship by using NPIV.

6. The storage system of claim 1 wherein the controller is configured to delete a zone based on the information of the attribute of the network used for transferring the command.

7. The storage system of claim 1, wherein the controller is configured to migrate the logical volume to a destination storage system, wherein the target port is associated with destination storage system and wherein the controller is configured to migrate the logical volume to the destination storage system based on the I/O path discovery.

8. The storage system of claim 1, wherein the controller is configured to retrieve the information of an attribute of the network used for transferring the command from the network.

9. A non-transitory computer readable storage medium storing instructions for executing a process, the instructions comprising:

receiving a command from a computer for reading or writing data via a network;

managing read or written data of a logical volume based on the command, and managing a first relationship among information of an initiator port of the computer, information of the logical volume, and information of an attribute of the network used for transferring the command;

create a new zone to the network based on the first relationship;

conduct an input/output (I/O) path discovery between the initiator port of the computer and a target port based on the new zone; and update the first relationship based on the I/O path discovery.

10. The non-transitory computer readable storage medium of claim 9, wherein the attribute of the network used for transferring the command comprises quality of service (QoS) information and traffic pathway information.

11. The non-transitory computer readable storage medium of claim 10, wherein the instructions further comprise translating a zone object format.

12. The non-transitory computer readable storage medium of claim 11, wherein the instructions further comprise taking over a second relationship between a boot configuration and a boot volume, wherein the target port is associated with the boot volume and wherein the controller is configured to facilitate access to the boot volume based on the I/O path discovery.

13. The non-transitory computer readable storage medium of claim 12, wherein the instructions further comprise taking over the second relationship by using Node Port Identifier Virtualization (NPIV).

14. The non-transitory computer readable storage medium of claim 12, wherein the instructions further comprise deleting a zone based on the information of the attribute of the network used for transferring the command.

15. The non-transitory computer readable storage medium of claim 13, wherein the instructions further comprise migrating the logical volume to a destination storage system, wherein the target port is associated with destination storage system and wherein the controller is configured to migrate the logical volume to the destination storage system based on the I/O path discovery.

16. The non-transitory computer readable storage medium of claim 14, wherein the instructions further comprise retrieving the information of an attribute of the network used for transferring the command from the network.

17. A method, comprising:

receiving a command from a computer for reading or writing data via a network;

managing read or written data of a logical volume based on the command, and managing a first relationship among information of an initiator port of the computer, information of the logical volume, and information of an attribute of the network used for transferring the command;

create a new zone to the network based on the first relationship;

conduct an input/output (I/O) path discovery between the initiator port of the computer and a target port based on the new zone; and update the first relationship based on the I/O path discovery.

18. The method of claim 17, wherein the attribute of the network used for transferring the command comprises quality of service (QoS) information and traffic pathway information.

* * * * *